US010641393B2

(12) United States Patent
Yamagishi et al.

(10) Patent No.: US 10,641,393 B2
(45) Date of Patent: May 5, 2020

(54) AUTOMATIC TRANSMISSION

(71) Applicant: Honda Motor Co., Ltd., Tokyo (JP)

(72) Inventors: Ryohei Yamagishi, Saitama (JP); Yuya Tachibanada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 183 days.

(21) Appl. No.: 15/916,289

(22) Filed: Mar. 9, 2018

(65) Prior Publication Data

US 2018/0283550 A1    Oct. 4, 2018

(30) Foreign Application Priority Data

Mar. 30, 2017 (JP) ................................ 2017-068263

(51) Int. Cl.
  *F16H 63/48* (2006.01)
  *F16D 41/16* (2006.01)

(52) U.S. Cl.
  CPC ........... *F16H 63/483* (2013.01); *F16D 41/16* (2013.01); *B60Y 2400/427* (2013.01); *F16H 2200/2012* (2013.01); *F16H 2200/2038* (2013.01); *F16H 2200/2084* (2013.01); *F16H 2306/40* (2013.01); *F16H 2312/12* (2013.01)

(58) Field of Classification Search
  CPC ............................... F16H 63/483; F16H 63/48
  See application file for complete search history.

(56) References Cited

U.S. PATENT DOCUMENTS 9,199,629 B2 * 12/2015 Ishikawa ................. F16H 61/16
10,132,387 B2 * 11/2018 Ishikawa ................... F16H 3/66

FOREIGN PATENT DOCUMENTS

JP            5863837           2/2016

* cited by examiner

*Primary Examiner* — Erin D Bishop
(74) *Attorney, Agent, or Firm* — JCIPRNET

(57) ABSTRACT

An automatic transmission for improving responsiveness until reverse movement is possible. When the range is switched from a parking range to a reverse range, P lock release control for releasing a parking state starts. When a two-way clutch is in a reverse rotation prevention state, hydraulic pressure is supplied to a first clutch, a third clutch, and a third brake, and a process in a reverse side preparation mode starts. When the first clutch is in a connected state and a rotational speed of an input shaft is a predetermined rotational speed, whether a parking piston of a parking lock mechanism is at an unlock position is determined. When it is at the unlock position, a driving source is requested to restrict an output torque. Then, hydraulic pressure is supplied to the two-way clutch, and the two-way clutch is switched from a reverse rotation prevention state to a fixed state.

2 Claims, 10 Drawing Sheets

| | C1 | C2 | C3 | B1 | B2 | B3 | F1 | GEAR RATIO | COMMON RATIO |
|---|---|---|---|---|---|---|---|---|---|
| Rvs | | | ○ | | ○ | | L | 4.008 | |
| 1st | | | | ○ | (○) | | R/L | 5.233 | 1.554 |
| 2nd | | ○ | | ○ | ○ | | R | 3.367 | 1.465 |
| 3rd | | | ○ | ○ | ○ | | R | 2.298 | 1.348 |
| 4th | | ○ | ○ | ○ | | | R | 1.705 | 1.251 |
| 5th | ○ | | (○) | ○ | | | R | 1.363 | 1.363 |
| 6th | ○ | ○ | ○ | | | | R | 1.000 | 1.273 |
| 7th | ○ | | ○ | | ○ | | R | 0.786 | 1.196 |
| 8th | ○ | ○ | | | ○ | | R | 0.657 | 1.126 |
| 9th | ○ | | | | ○ | ○ | R | 0.584 | 1.120 |
| 10th | ○ | ○ | | | | ○ | R | 0.520 | |

AUTOMATIC TRANSMISSION

CROSS-REFERENCE TO RELATED APPLICATION

This application claims the priority benefit of Japan application serial no. 2017-068263, filed on Mar. 30, 2017. The entirety of the above-mentioned patent application is hereby incorporated by reference herein and made a part of this specification.

BACKGROUND

Technical Field

The disclosure relates to an automatic transmission mounted in a vehicle.

Description of Related Art

In the related art, an automatic transmission that is mounted in a vehicle and can convert an output of a driving source and transmit it to drive wheels is known (for example, refer to Patent Document 1). A plurality of clutches and brakes are provided in the automatic transmission and the clutches and brakes are controlled by hydraulic pressure.

In an automatic transmission configured to control a clutch and a brake with hydraulic pressure, when a shift position is switched from a parking range to a reverse range, parking release control for releasing a parking state is performed, and after the parking state is released, operation is in a reverse side preparation mode for moving backwards. Then, when the reverse side preparation mode is canceled, the mode becomes a reverse normal mode in which reverse movement is possible.

[Patent Document 1] Japanese Patent No. 5863837

SUMMARY

In operation in a reverse side preparation mode after a parking state is released in order to set a reverse normal mode in which reverse movement is possible, a time from when a shift position is switched from a parking range to a reverse range until reverse movement is actually possible is long and responsiveness is not favorable.

The disclosure has been made in view of the above circumstances and an object of the disclosure is to provide an automatic transmission capable of improving responsiveness until reverse movement is possible.

In order to achieve the above object, the disclosure provides an automatic transmission including an input unit (for example, an input shaft 11 of an embodiment; hereinafter the same) which is disposed inside a housing (for example, a transmission case 10 of an embodiment; hereinafter the same) to which power of a driving source (for example, a driving source ENG of an embodiment; hereinafter the same) is transmitted, planetary gear mechanisms (for example, planetary gear mechanisms PG1 to PG4 of an embodiment; hereinafter the same) including a plurality of elements (for example, sun gears Sa, Sb, Sc, and Sd, carriers Ca, Cb, Cc, and Cd, and ring gears Ra, Rb, Rc, and Rd of an embodiment; hereinafter the same) that are rotatable inside the housing, a plurality of engagement mechanisms (for example, clutches C1 to C3 and brakes B1 to B3 of an embodiment; hereinafter the same) that are switchable between a connected state in which the elements are connected and a fixed state in which an element is fixed to the housing, an output unit (for example, an output member 13 of an embodiment; hereinafter the same), a parking lock mechanism (for example, a parking lock mechanism 40 of an embodiment; hereinafter the same), and a control unit (for example, a transmission control device ECU of an embodiment; hereinafter the same) configured to control the parking lock mechanism and the engagement mechanisms. The automatic transmission configured to shift rotation of the input unit to a plurality of stages and output it from the output unit includes a switching mechanism (for example, a two-way clutch F1 of an embodiment; hereinafter the same) that is switchable between a reverse rotation prevention state in which forward rotation of one element among the plurality of elements is allowed and reverse rotation is prevented and a fixed state in which the element is fixed to the housing. When a shift position is in a reverse range, the switching mechanism is put into the fixed state by the control unit. When the shift position is switched from a parking range to the reverse range, the control unit is able to perform a parking release control (for example, P lock release control of an embodiment; hereinafter the same) in which, a parking state of the parking lock mechanism is released, and a reverse side preparation mode (for example, a reverse side preparation mode of an embodiment; hereinafter the same) in which, when the engagement mechanism is put into a connected state or a fixed state, a rotational speed of the element fixed by the switching mechanism is set to a predetermined rotational speed or lower. The control unit performs the parking release control and the reverse side preparation mode at the same time.

According to the disclosure, when the shift position is switched from a parking range to a reverse range, the parking release control in which a parking state is released and the reverse side preparation mode in which, when the engagement mechanism is put into a connected state or a fixed state, a rotational speed of the element fixed by the switching mechanism is set to a predetermined rotational speed or lower are performed at the same time. Therefore, compared to a case in which operation is in the reverse side preparation mode after the parking release control ends, it is possible to shorten a transition time from the parking state until the mode transitions to a reverse normal mode in which reverse driving can be performed, and it is possible to improve responsiveness.

In addition, in the disclosure, as planetary gear mechanisms, there are four planetary gear mechanisms (for example, first to fourth planetary gear mechanisms PG1 to PG4 of an embodiment; hereinafter the same) each including three elements including a sun gear (for example, sun gears Sa, Sb, Sc, and Sd of an embodiment; hereinafter the same), a carrier (for example, carriers Ca, Cb, Cc, and Cd of an embodiment; hereinafter the same), and a ring gear (for example, ring gears Ra, Rb, Rc, and Rd of an embodiment; hereinafter the same). The three elements of the third planetary gear mechanism are a first element (for example, a sun gear Sc of an embodiment; hereinafter the same), a second element (for example, a carrier Cc of an embodiment; hereinafter the same) and a third element (for example, a ring gear Rc of an embodiment; hereinafter the same) in an arrangement order at intervals corresponding to a gear ratio in a collinear diagram that is able to express a relative rotation speed ratio by a straight line. The three elements of the fourth planetary gear mechanism are a fourth element (for example, a ring gear Rd of an embodiment; hereinafter the same), a fifth element (for example, a carrier Cd of an embodiment; hereinafter the same) and a sixth element (for example, a sun gear Sd of an embodiment;

hereinafter the same) in an arrangement order at intervals corresponding to a gear ratio in a collinear diagram that is able to express a relative rotation speed ratio by a straight line. The three elements of the first planetary gear mechanism are a seventh element (for example, a sun gear Sa of an embodiment; hereinafter the same), an eighth element (for example, a carrier Ca of an embodiment; hereinafter the same), and a ninth element (for example, a ring gear Ra of an embodiment; hereinafter the same) in an arrangement order at intervals corresponding to a gear ratio in a collinear diagram that is able to express a relative rotation speed ratio by a straight line. The three elements of the second planetary gear mechanism are a tenth element (for example, a ring gear Rb of an embodiment; hereinafter the same), an eleventh element (for example, a carrier Cb of an embodiment; hereinafter the same), and a twelfth element (for example, a sun gear Sb of an embodiment; hereinafter the same) in an arrangement order at intervals corresponding to a gear ratio in a collinear diagram. The first element is connected to the input unit. The tenth element is connected to the output unit. The second element, the fifth element, and the ninth element are connected to form a first connected body (for example, a first connected body Cc-Cd-Ra of an embodiment; hereinafter the same). The third element and the twelfth element are connected to form a second connected body (for example, a second connected body Rc-Sb of an embodiment; hereinafter the same). The eighth element and the eleventh element are connected to form a third connected body (for example, a third connected body Ca-Cb of an embodiment; hereinafter the same). The engagement mechanism includes three clutches (for example, first to third clutches C1 to C3 of an embodiment; hereinafter the same), three brakes (for example, first to third brakes B1 to B3 of an embodiment; hereinafter the same), and a two-way clutch (for example, a two-way clutch F1 of embodiment; hereinafter the same). The first clutch is switchable between a connected state in which the first element and the third connected body are connected and an open state in which the connection is disconnected. The second clutch is switchable between a connected state in which the sixth element and the second connected body are connected and an open state in which the connection is disconnected. The third clutch is switchable between a connected state in which the first element and the fourth element are connected and an open state in which the connection is disconnected. The first brake is switchable between a fixed state in which the seventh element is fixed to the housing and an open state in which the fixed state is released. The second brake is switchable between a fixed state in which the sixth element is fixed to the housing and an open state in which the fixed state is released. The third brake is switchable between a fixed state in which the fourth element is fixed to the housing and an open state in which the fixed state is released. The two-way clutch is switchable between a reverse rotation prevention state in which forward rotation of the third connected body is allowed and reverse rotation is prevented and a fixed state in which rotation of the third connected body is prevented. The switching mechanism includes the two-way clutch. It is preferable that the control unit switch the two-way clutch from the reverse rotation prevention state to the fixed state when the parking release control is performed and the parking state is then released.

In the parking locked state, when the two-way clutch is switched from a reverse rotation prevention state to a fixed state, the parking release control and the reverse side preparation mode are performed, and additionally, the two-way clutch is switched from a reverse rotation prevention state to a fixed state at the same time, a discharge amount of an oil pump configured to supply hydraulic pressure for operating elements may be insufficient. When a discharge amount of the oil pump is insufficient, one of the first clutch, the third clutch, and the third brake slips and differential rotation of the two-way clutch occurs. In a period in which differential rotation of the two-way clutch occurs, when the two-way clutch is switched from a reverse rotation prevention state to a fixed state, the two-way clutch may be damaged.

In the disclosure, since the two-way clutch is switched from a reverse rotation prevention state to a fixed state after the parking state is released, a discharge amount of the oil pump is sufficient. Accordingly, differential rotation of the two-way clutch does not occur and the two-way clutch is not damaged.

DESCRIPTION OF THE EMBODIMENTS

An automatic transmission of an embodiment and a vehicle in which the transmission is mounted will be described with reference to the drawings.

Figure 1:
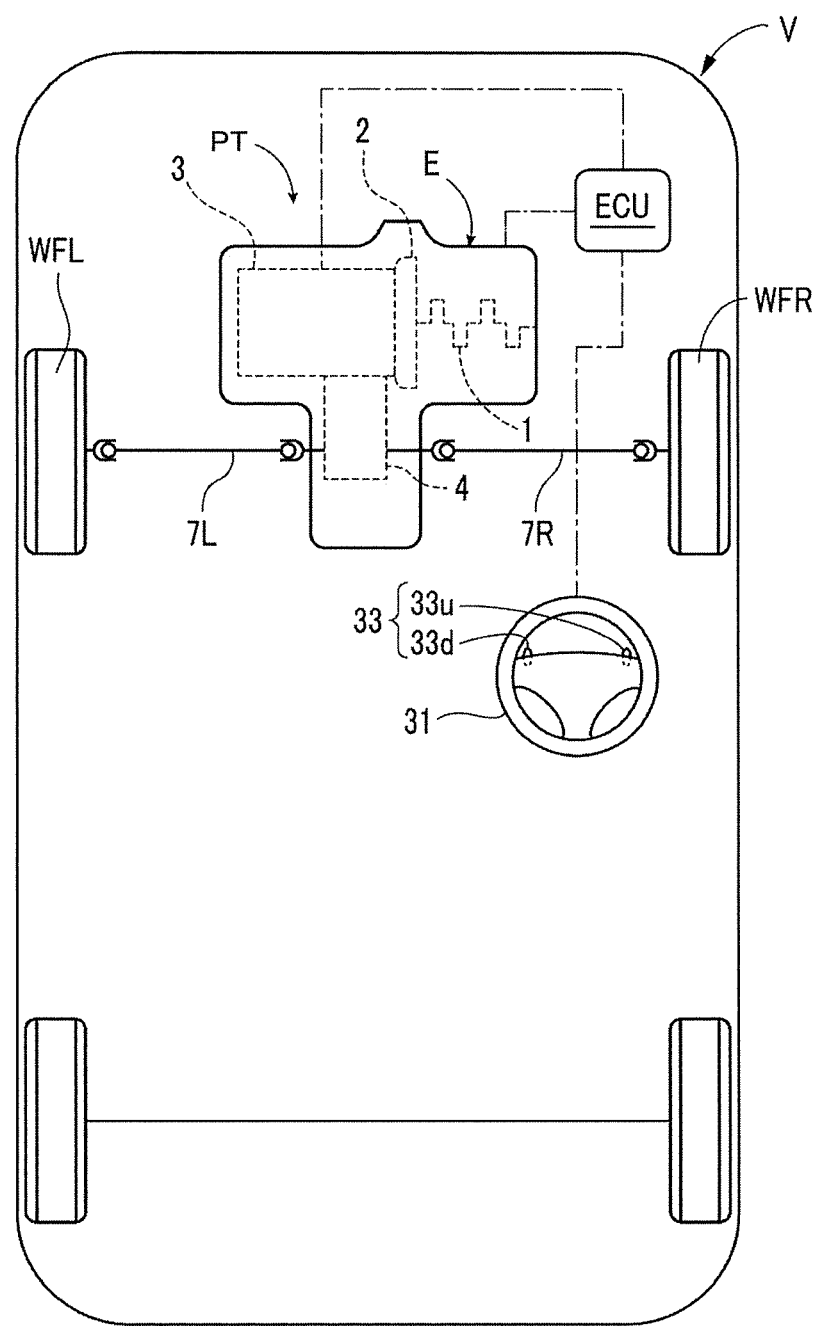
FIG. 1 is an explanatory diagram schematically showing a vehicle in which an automatic transmission of an embodiment is mounted.

As shown in FIG. 1, in a vehicle V in which the automatic transmission of the present embodiment is mounted, an engine E (an internal combustion engine as a driving source; an electric motor may be used in place of the engine E) is mounted in a vehicle body sideways so that a crankshaft 1 is directed in the left to right direction in the vehicle body. A driving force output from the engine E is transmitted to a power transmission device PT. Then, the power transmission device PT adjusts a driving force of the engine E according to a selected gear ratio and transmits it to left and right front wheels WFL and WFR.

The power transmission device PT includes an automatic transmission 3 having a torque converter 2 connected to the crankshaft 1 and a front differential gear 4 connected to the automatic transmission 3.

The front differential gear 4 is connected to the left and right front wheels WFL and WFR through a front left axle 7L and a front right axle 7R.

Figure 2:
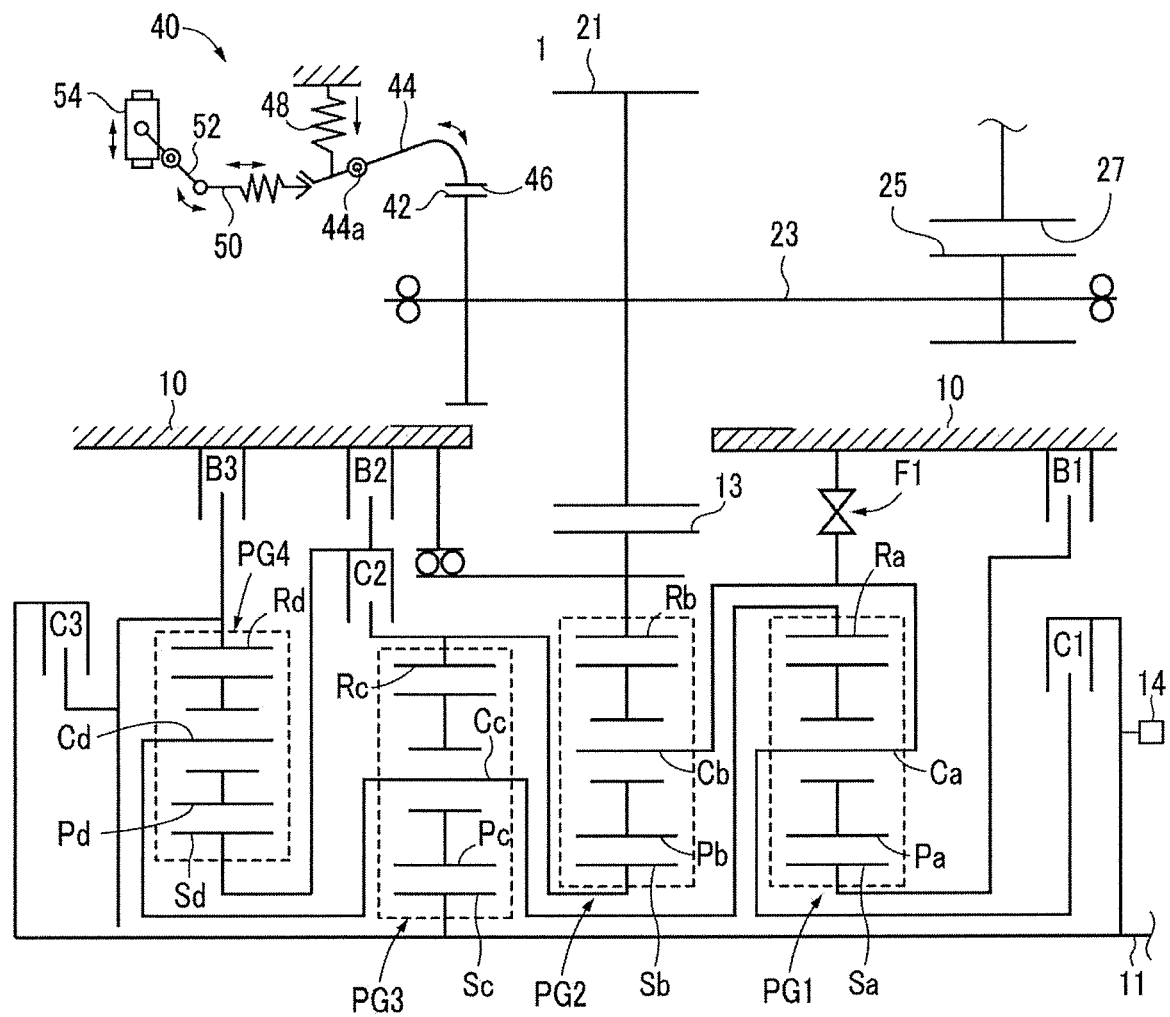
FIG. 2 is a skeleton diagram showing the automatic transmission of the present embodiment.

FIG. 2 is a skeleton diagram showing a part of the automatic transmission 3 excluding the torque converter 2. The automatic transmission 3 includes an input shaft 11 that is rotatably pivotally supported in a transmission case 10 as a housing, as an input member to which a driving force output from the engine E is transmitted through the torque converter 2 including a lock-up clutch and a damper, and an output member 13 including an output gear that is disposed concentrically with the input shaft 11. In addition, the automatic transmission 3 includes a sensor 14 configured to detect a rotational speed of the input shaft 11. Here, a rotational speed of the input shaft 11 can be detected using another device other than the sensor.

Rotation of the output member 13 is transmitted to left and right drive wheels (the front wheels WFL and WFR) of a vehicle through an idle gear 21 meshed with the output member 13, an idle shaft 23 pivotally supporting the idle gear 21, a final drive gear 25 pivotally supported on the idle shaft 23, and the front differential gear 4 including a final driven gear 27 meshed with the final drive gear 25. Here, in place of the torque converter 2, a frictionally engageable single plate type or multi-plate type starting clutch may be provided. In addition, a propeller shaft can be connected in place of the front differential gear 4 and applied to a rear wheel drive vehicle. In addition, a propeller shaft can be connected to the front differential gear 4 via a transfer and applied to a four-wheel drive vehicle.

In addition, the automatic transmission 3 of the present embodiment includes a parking lock mechanism 40. A parking gear 42 of the parking lock mechanism 40 is fixed to and rotates together with the idle shaft 23. A parking pole 44 pivotally supported on a support shaft 44a is disposed in the vicinity of the parking gear 42. A locking claw 46 is provided at an end on the side of the parking gear 42 of the parking pole 44. When the locking claw 46 is engaged with the parking gear 42, the state is put into a state (parking locked state) in which drive wheels (font wheels WFL and WFR) are unable to rotate through the idle shaft 23. The parking pole 44 is biased by a release spring 48 in a direction in which the locking claw 46 releases from the parking gear 42.

A cam 50 is disposed at the other end of the parking pole 44 in a freely moving forward and backward manner. When the cam 50 moves forward, the parking pole 44 swings against a biasing force of the release spring 48, and the locking claw 46 is engaged with the parking gear 42. When the cam 50 moves backward, the parking pole 44 returns to an original position due to a biasing force of the release spring 48, and the locking claw 46 and the parking gear 42 are disengaged.

A parking piston 54 is connected to the cam 50 via a link 52. The parking piston 54 is movable in its own axial direction due to hydraulic pressure. Then, when the parking piston 54 moves in the axial direction, the cam 50 moves forward and backward via the link 52.

Inside the transmission case 10 as a housing, four planetary gear mechanisms (first to fourth planetary gear mechanisms PG1 to PG4) are disposed concentrically with the input shaft 11 in order from a driving source ENG side.

The first planetary gear mechanism PG1 is a so-called single pinion type planetary gear mechanism which includes a sun gear Sa, a ring gear Ra, and a carrier Ca that pivotally supports a pinion Pa meshed with the sun gear Sa and the ring gear Ra rotatably and revolvingly.

The so-called single pinion type planetary gear mechanism is also called a minus planetary gear mechanism or a negative planetary gear mechanism because the ring gear rotates in a direction different from that in the sun gear when the carrier is fixed and the sun gear is rotated. Here, in the so-called single pinion type planetary gear mechanism, when the ring gear is fixed and the sun gear is rotated, the carrier rotates in the same direction as the sun gear.

Figure 3:
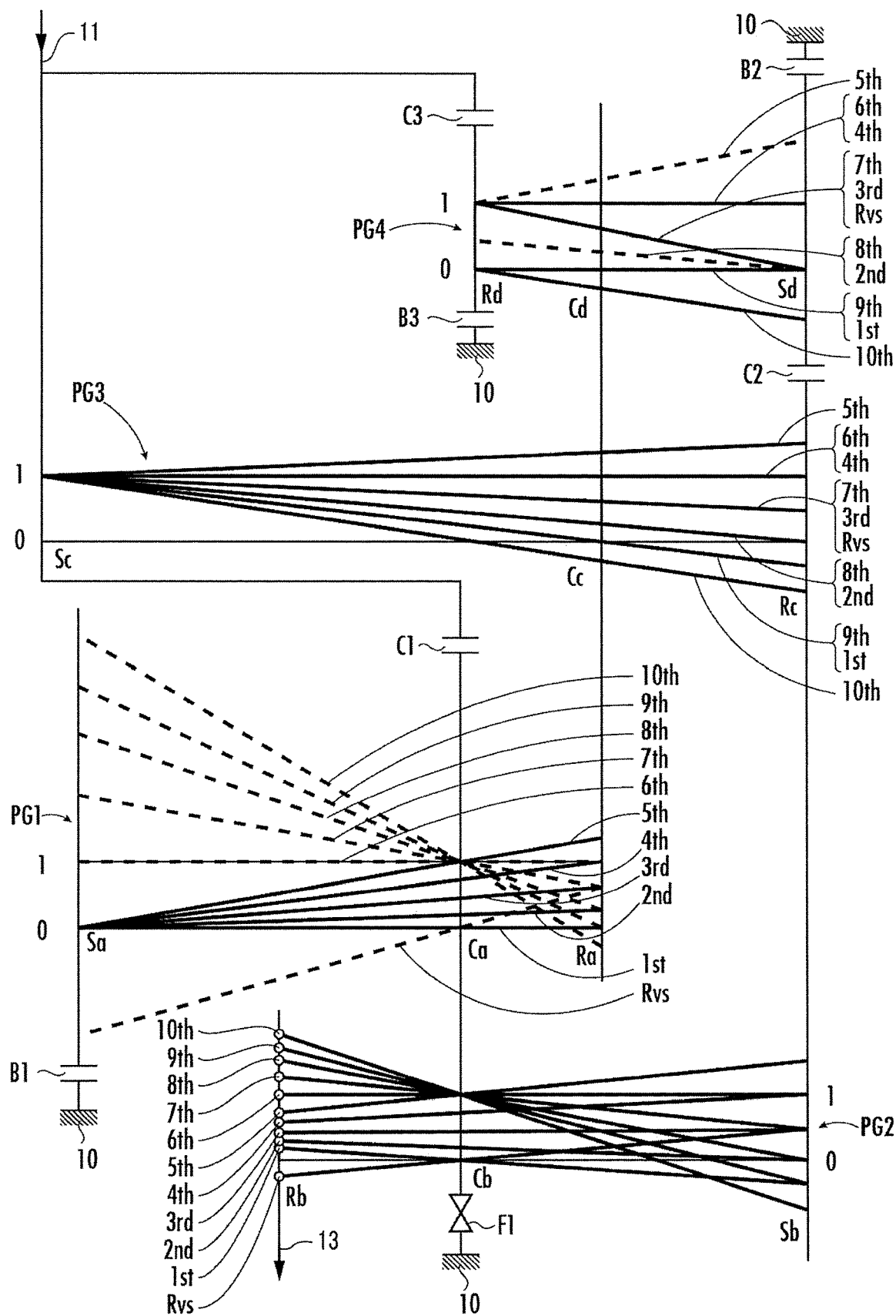
FIG. 3 is a collinear diagram of a planetary gear mechanism of the present embodiment.

With reference to a collinear diagram of the first planetary gear mechanism PG1 shown in the third part from the top in FIG. 3, when the three elements Sa, Ca, and Ra of the first planetary gear mechanism PG1 are referred to as a seventh element, an eighth element, and a ninth element from the left side, respectively, in the order of arrangement at intervals corresponding to the gear ratio in the collinear diagram, the seventh element is the sun gear Sa, the eighth element is the carrier Ca, and the ninth element is the ring gear Ra. A ratio between an interval between the sun gear Sa and the carrier Ca and an interval between the carrier Ca and the ring gear Ra is set to h:1 when the gear ratio of the first planetary gear mechanism PG1 is h.

The second planetary gear mechanism PG2 is a so-called single pinion type planetary gear mechanism which includes a sun gear Sb, a ring gear Rb, and a carrier Cb that pivotally supports a pinion Pb meshed with the sun gear Sb and the ring gear Rb rotatably and revolvingly.

With reference to a collinear diagram of the second planetary gear mechanism PG2 shown in the fourth part (the bottom part) from the top in FIG. 3, when the three elements Sb, Cb, and Rb of the second planetary gear mechanism PG2 are referred to as a tenth element, an eleventh element, and a twelfth element from the left side, respectively, in the order of arrangement at intervals corresponding to the gear ratio in the collinear diagram, the tenth element is the ring gear Rb, the eleventh element is the carrier Cb, and the twelfth element is the sun gear Sb. A ration between an interval between the sun gear Sb and the carrier Cb and an interval between the carrier Cb and the ring gear Rb is set to i:1 when the gear ratio of the second planetary gear mechanism PG2 is i.

The third planetary gear mechanism PG3 is a so-called single pinion type planetary gear mechanism which includes a sun gear Sc, a ring gear Rc, and a carrier Cc that pivotally supports a pinion Pc meshed with the sun gear Sc and the ring gear Rc rotatably and revolvingly.

With reference to a collinear diagram (a diagram that can express ratios between relative rotational speeds of the three elements including the sun gear, the carrier, and the ring gear by straight lines (speed lines)) of the third planetary gear mechanism PG3 shown in the second part from the top in FIG. 3, when the three elements Sc, Cc, and Rc of the third planetary gear mechanism PG3 are referred to as a first element, a second element, and a third element from the left side, respectively, in the order of arrangement at intervals corresponding to the gear ratio (the number of teeth of the ring gear/the number of teeth of the sun gear) in the collinear diagram, the first element is the sun gear Sc, the second element is the carrier Cc, and the third element is the ring gear Rc.

Here, a ratio between an interval between the sun gear Sc and the carrier Cc and an interval between the carrier Cc and the ring gear Re is set to j:1 when the gear ratio of the third planetary gear mechanism PG3 is j. Here, in the collinear diagram, the lower horizontal line and the upper horizontal line (lines overlapping $4^{th}$ and $6^{th}$) indicate a rotational speed of "0" and "1" (the same rotational speed as the input shaft 11), respectively.

The fourth planetary gear mechanism PG4 is a so-called single pinion type planetary gear mechanism which includes a sun gear Sd, a ring gear Rd, and a carrier Cd that pivotally supports a pinion Pd meshed with the sun gear Sd and the ring gear Rd rotatably and revolvingly.

With reference to a collinear diagram of the fourth planetary gear mechanism PG4 shown in the first part (the top part) from the top in FIG. 3, when the three elements Sd, Cd, and Rd of the fourth planetary gear mechanism PG4 are referred to as a fourth element, a fifth element, and a sixth element from the left side, respectively, in the order of arrangement at intervals corresponding to the gear ratio in the collinear diagram, the fourth element is the ring gear Rd, the fifth element is the carrier Cd, and the sixth element is the sun gear Sd. A ratio between an interval between the sun gear Sd and the carrier Cd and an interval between the carrier Cd and the ring gear Rd is set to k:1 when the gear ratio of the fourth planetary gear mechanism PG4 is i.

The sun gear Sc (the first element) of the third planetary gear mechanism PG3 is connected to the input shaft 11. In addition, the ring gear Rb (the tenth element) of the second planetary gear mechanism PG2 is connected to the output member 13 including an output gear.

In addition, the carrier Cc (the second element) of the third planetary gear mechanism PG3, the carrier Cd (the fifth element) of the fourth planetary gear mechanism PG4, and the ring gear Ra (the ninth element) of the first planetary gear mechanism PG1 are connected to form a first connected body Cc-Cd-Ra. In addition, the ring gear Rc (the third element) of the third planetary gear mechanism PG3 and the sun gear Sb (the twelfth element) of the second planetary gear mechanism PG2 are connected to form a second connected body Rc-Sb. In addition, the carrier Ca (the eighth element) of the first planetary gear mechanism PG1 and the carrier Cb (the eleventh element) of the second planetary gear mechanism PG2 are connected to form a third connected body Ca-Cb.

In addition, the automatic transmission of the present embodiment includes seven engagement mechanisms including three first to third clutches C1 to C3, three first to third brakes B1 to B3, and one two-way clutch F1.

The first clutch C1 is a hydraulically actuated wet multi-plate clutch and is switchable between a connected state in which the sun gear Sc (the first element) of the third planetary gear mechanism PG3 and the third connected body Ca-Cb are connected and an open state in which the connection is disconnected.

The third clutch C3 is a hydraulically actuated wet multi-plate clutch and is switchable between a connected state in which the sun gear Sc (the first element) of the third planetary gear mechanism PG3 and the ring gear Rd (the fourth element) of the fourth planetary gear mechanism PG4 are connected and an open state in which the connection is disconnected.

The second clutch C2 is a hydraulically actuated wet multi-plate clutch and is switchable between a connected state in which the sun gear Sd (the sixth element) of the fourth planetary gear mechanism PG4 and the second connected body Rc-Sb are connected and an open state in which the connection is disconnected.

The two-way clutch F1 also has a function as a fourth brake B4, and allows forward rotation (rotation direction of the input shaft 11 and/or rotation in the same direction as a rotation direction of the output member 13 when a vehicle moves forward) of the third connected body Ca-Cb, and is switchable between a reverse rotation prevention state in which reverse rotation (in a direction of rotation opposite to forward rotation) is prevented and a fixed state in which the third connected body Ca-Cb is fixed to the transmission case 10.

In the reverse rotation prevention state, when a rotational force in a forward rotation direction is applied to the third connected body Ca-Cb, the two-way clutch F1 is put into an open state in which the rotation is allowed, and when a rotational force in a reverse rotation direction is applied, the two-way clutch F1 is put into a fixed state in which the rotation is prevented and the third connected body Ca-Cb is fixed to the transmission case 10. In the present embodiment, the two-way clutch corresponds to a switching mechanism.

The first brake B1 is a hydraulically actuated wet multi-plate clutch and is switchable between a fixed state in which the sun gear Sa (the seventh element) of the first planetary gear mechanism PG1 is fixed to the transmission case 10 and an open state in which the fixed state is released.

The second brake B2 is a hydraulically actuated wet multi-plate clutch and is switchable between a fixed state in which the sun gear Sd (the sixth element) of the fourth planetary gear mechanism PG4 is fixed to the transmission case 10 and an open state in which the fixed state is released. The third brake B3 is a hydraulically actuated wet multi-plate clutch and is switchable between a fixed state in which the ring gear Rd (the fourth element) of the fourth planetary gear mechanism PG4 is fixed to the transmission case 10 and an open state in which the fixed state is released.

States of the clutches C1 to C3 and the brakes B1 to B3, and the two-way clutch F1 are switched on the basis of vehicle information such as a travel speed of a vehicle transmitted from an integrated control unit (not shown) by a transmission control device ECU including a transmission control unit (TCU) shown in FIG. 1.

The transmission control device ECU includes an electronic unit constituted by a CPU, a memory, and the like (not shown), and can receive predetermined vehicle information such as a travel speed and an accelerator opening of the vehicle V, a rotational speed and an output torque of the engine E, and operation information of a paddle shift lever 33, and execute a control program stored in a storage device such as a memory in the CPU, and thus controls the automatic transmission 3 (transmission mechanism).

As shown in FIG. 1, the paddle shift lever 33 is provided on a handle 31 of the vehicle V of the present embodiment, upshifting is performed by a manual operation when a right paddle 33u is pulled forward, and downshifting is performed by a manual operation when a left paddle 33d is pulled forward. An operation signal of the paddle shift lever 33 is transmitted to the transmission control device ECU.

Here, an operation unit for performing a manual operation is not limited to the paddle shift lever 33 of the embodiment. Another operation unit, for example, a shift lever disposed between a driver's seat and a passenger's seat or a button disposed on a handle may be used.

As shown in FIG. 2, on the axis of the input shaft 11, from the side of the driving source ENG and the torque converter 2, the first clutch C1, the first planetary gear mechanism PG1, the second planetary gear mechanism PG2, the third planetary gear mechanism PG3, the second clutch C2, the fourth planetary gear mechanism PG4, and the third clutch C3 are disposed in that order.

Then, the third brake B3 is disposed radially outward from the fourth planetary gear mechanism PG4, the second brake B2 is disposed radially outward from the second clutch C2, the first brake B1 is disposed radially outward from the first clutch C1, and the two-way clutch F1 is disposed radially outward from the first planetary gear mechanism PG1.

In this manner, when the three brakes B1 to B3 and the two-way clutch F1 are disposed radially outward from a planetary gear mechanism or a clutch, it is possible to reduce the axial length of the automatic transmission 3 compared with when the brakes B1 to B3 and the two-way clutches F1 are disposed in parallel along the axis of the input shaft 11 together with the planetary gear mechanisms and the clutches. Here, the third brake B3 may be disposed radially outward from the third clutch C3 and the second brake B2 may be disposed radially outward from the fourth planetary gear mechanism PG4.

Next, a case in which gear stages of the automatic transmission 3 of the embodiment are set will be described with reference to FIG. 3 and FIG. 4.

In order to set a first gear, the two-way clutch F1 is put into a reverse rotation prevention state (R in FIG. 4) and the first brake B1 and the second brake B2 are put into a fixed state. When the two-way clutch F1 is put into a reverse rotation prevention state (R) and the first brake B1 is put into a fixed state, reverse rotation of the third connected body Ca-Cb and the sun gear Sa (the seventh element) of the first planetary gear mechanism PG1 are prevented, and rotational speeds of the third connected body Ca-Cb and the sun gear Sa (the seventh element) of the first planetary gear mechanism PG1 are "0."

Accordingly, three elements (seventh to ninth elements Sa, Ca, and Ra) of the first planetary gear mechanism PG1 are put into a locked state in which relative rotation is not possible, and a rotational speed of the first connected body Cc-Cd-Ra including the ring gear Ra (the ninth element) of the first planetary gear mechanism PG1 is "0." Then, a rotational speed of the ring gear Rb (the tenth element) of the second planetary gear mechanism PG2 to which the output member 13 is connected becomes "1st" shown in FIG. 3 and the first gear is set.

Here, in order to set the first gear, it is not necessary to set the second brake B2 in a fixed state. However, the second brake B2 is set in the first gear in a fixed state so that shifting from the first gear to a second gear to be described below can be performed smoothly. In addition, in order for an engine brake to be effective in the first gear, the two-way clutch F1 may be switched from a reverse rotation prevention state (R) to a fixed state (L).

In order to set the second gear, the two-way clutch F1 is put into a reverse rotation prevention state (R), the first brake B1 and the second brake B2 are put into a fixed state, and the second clutch C2 is put into a connected state. When the two-way clutch F1 is put into a reverse rotation prevention state, forward rotation of the third connected body Ca-Cb is allowed. In addition, when the first brake B1 is put into a fixed state, a rotational speed of the sun gear Sa (the seventh element) of the first planetary gear mechanism PG1 is "0." In addition, when the second brake B2 is put into a fixed state, a rotational speed of the sun gear Sd (the sixth element) of the fourth planetary gear mechanism PG4 is "0."

In addition, when the second clutch C2 is put into a connected state, a rotational speed of the second connected body Rc-Sb is "0" that is the same speed as a rotational speed of the sun gear Sd (the sixth element) of the fourth planetary gear mechanism PG4. Then, a rotational speed of the ring gear Rb (the tenth element) of the second planetary gear mechanism PG2 to which the output member 13 is connected is "$2^{nd}$" shown in FIG. 3, and the second gear is set.

In order to set a third gear, the two-way clutch F1 is put into a reverse rotation prevention state, the first brake B1 and the second brake B2 are put into a fixed state, and the third clutch C3 is put into a connected state. When the two-way clutch F1 is put into a reverse rotation prevention state, forward rotation of the third connected body Ca-Cb is allowed. In addition, when the first brake B1 is put into a fixed state, a rotational speed of the sun gear Sa (the seventh element) of the first planetary gear mechanism PG1 is "0." In addition, when the second brake B2 is put into a fixed state, a rotational speed of the sun gear Sd (the sixth element) of the fourth planetary gear mechanism PG4 is "0."

In addition, when the third clutch C3 is put into a connected state, a rotational speed of the ring gear Rd (the fourth element) of the fourth planetary gear mechanism PG4 is "1" that is the same speed as a rotational speed of the sun gear Sc (the first element) of the third planetary gear mechanism PG3 connected to the input shaft 11. Since a rotational speed of the sun gear Sd (the sixth element) of the fourth planetary gear mechanism PG4 is "0" and a rotational speed of the ring gear Rd (the fourth element) is "1," a rotational speed of the carrier Cd (the fifth element), that is, a rotational speed of the first connected body Cc-Cd-Ra is k/(k+1).

Then, a rotational speed of the ring gear Rb (the tenth element) of the second planetary gear mechanism PG2 to which the output member 13 is connected is "$3^{rd}$" shown in FIG. 3, and the third gear is set.

In order to set a fourth gear, the two-way clutch F1 is put into a reverse rotation prevention state, the first brake B1 is put into a fixed state, and the second clutch C2 and the third clutch C3 are put into a connected state. When the two-way clutch F1 is put into a reverse rotation prevention state, forward rotation of the third connected body Ca-Cb is allowed. In addition, when the first brake B1 is put into a fixed state, a rotational speed of the sun gear Sa (the seventh element) of the first planetary gear mechanism PG1 is "0."

In addition, when the second clutch C2 is put into a connected state, the sun gear Sd (the sixth element) of the fourth planetary gear mechanism PG4 and the second connected body Rc-Sb rotate at the same speed. Accordingly, between the third planetary gear mechanism PG3 and the fourth planetary gear mechanism PG4, the carrier Cc (the second element) and the carrier Cd (the fifth element) are connected, and the ring gear Rc (the third element) and the sun gear Sd (the sixth element) are connected. In the fourth gear in which the second clutch C2 is put into a connected state, one collinear diagram including four elements can be drawn by the third planetary gear mechanism PG3 and the fourth planetary gear mechanism PG4.

Then, when the third clutch C3 is put into a connected state, a rotational speed of the ring gear Rd (the fourth element) of the fourth planetary gear mechanism PG4 is "1" that is the same speed as a rotational speed of the sun gear Sc (the first element) of the third planetary gear mechanism PG3, and rotational speeds of two elements among four elements constituted by the third planetary gear mechanism PG3 and the fourth planetary gear mechanism PG4 are the same speed of "1."

Accordingly, elements of the third planetary gear mechanism PG3 and the fourth planetary gear mechanism PG4 are put into a locked state in which relative rotation is not possible, and rotational speeds of all elements of the third planetary gear mechanism PG3 and the fourth planetary gear mechanism PG4 are "1." Then, a rotational speed of the third connected body Ca-Cb is h/(h+1), and a rotational speed of the ring gear Rb (the tenth element) of the second planetary gear mechanism PG2 to which the output member 13 is connected is "4$^{th}$" shown in FIG. 3, and the fourth gear is set.

In order to set a fifth gear, the two-way clutch F1 is put into a reverse rotation prevention state, the first brake B1 is put into a fixed state, and the first clutch C1 and the third clutch C3 are put into a connected state. When the two-way clutch F1 is put into a reverse rotation prevention state, forward rotation of the third connected body Ca-Cb is allowed. In addition, when the first brake B1 is put into a fixed state, a rotational speed of the sun gear Sa (the seventh element) of the first planetary gear mechanism PG1 is "0."

In addition, when the first clutch C1 is put into a connected state, a rotational speed of the third connected body Ca-Cb is "1" that is the same speed as a rotational speed of the sun gear Sc (the first element) of the third planetary gear mechanism PG3. Then, a rotational speed of the ring gear Rb (the tenth element) of the second planetary gear mechanism PG2 to which the output member 13 is connected is "5$^{th}$" shown in FIG. 3, and the fifth gear is set.

Here, in order to set the fifth gear, it is not necessary to set the third clutch C3 in a connected state. However, since it is necessary to set the third clutch C3 in a connected state in the fourth gear and a sixth gear to be described below, the fifth gear is also put into a connected state so that downshifting from the fifth gear to the fourth gear and upshifting from the fifth gear to the sixth gear to be described below are performed smoothly.

In order to set the sixth gear, the two-way clutch F1 is put into a reverse rotation prevention state and three clutches (first to third clutches C1 to C3) are put into a connected state. When the two-way clutch F1 is put into a reverse rotation prevention state, forward rotation of the third connected body Ca-Cb is allowed.

In addition, when the second clutch C2 and the third clutch C3 are put into a connected state, as described in the fourth gear, elements of the third planetary gear mechanism PG3 and the fourth planetary gear mechanism PG4 are put into a state in which relative rotation is not possible and a rotational speed of the second connected body Rc-Sb is "1." In addition, when the first clutch C1 is put into a connected state, a rotational speed of the third connected body Ca-Cb is "1."

Accordingly, in the second planetary gear mechanism PG2, the carrier Cb (the eleventh element) and the sun gear Sb (the twelfth element) are the same speed of "1," and elements are put into a locked state in which relative rotation is not possible. Then, a rotational speed of the ring gear Rb (the tenth element) of the second planetary gear mechanism PG2 to which the output member 13 is connected is "1" of "6$^{th}$" shown in FIG. 3, and the sixth gear is set. In order to set a seventh gear, the two-way clutch F1 is put into a reverse rotation prevention state, the second brake B2 is put into a fixed state, and the first clutch C1 and the third clutch C3 are put into a connected state. When the two-way clutch F1 is put into a reverse rotation prevention state, forward rotation of the third connected body Ca-Cb is allowed.

In addition, when the second brake B2 is put into a fixed state, a rotational speed of the sun gear Sd (the sixth element) of the fourth planetary gear mechanism PG4 is "0." In addition, when the third clutch C3 is put into a connected state, a rotational speed of the ring gear Rd (the fourth element) of the fourth planetary gear mechanism PG4 is "1" that is the same speed as a rotational speed of the sun gear Sc (the first element) of the third planetary gear mechanism PG3, and a rotational speed of the first connected body Cc-Cd-Ra including the carrier Cd (the fifth element) of the fourth planetary gear mechanism PG4 is k/(k+1).

In addition, when the first clutch C1 is put into a connected state, a rotational speed of the third connected body Ca-Cb is "1" that is the same speed as a rotational speed of the sun gear Sc (the first element) of the third planetary gear mechanism PG3 connected to the input shaft 11. Then, a rotational speed of the ring gear Rb (the tenth element) of the second planetary gear mechanism PG2 to which the output member 13 is connected is "7$^{th}$" shown in FIG. 3, and the seventh gear is set.

In order to set an eighth gear, the two-way clutch F1 is put into a reverse rotation prevention state, the second brake B2 is put into a fixed state, and the first clutch C1 and the second clutch C2 are put into a connected state. When the two-way clutch F1 is put into a reverse rotation prevention state, forward rotation of the third connected body Ca-Cb is allowed.

In addition, when the second brake B2 is put into a fixed state, a rotational speed of the sun gear Sd (the sixth element) of the fourth planetary gear mechanism PG4 is "0." In addition, when the second clutch C2 is put into a connected state, a rotational speed of the second connected body Rc-Sb is "0" that is the same speed as a rotational speed of the sun gear Sd (the sixth element) of the fourth planetary gear mechanism PG4.

In addition, when the first clutch C1 is put into a connected state, a rotational speed of the third connected body Ca-Cb is "1" that is the same speed as a rotational speed of the sun gear Sc (the first element) of the third planetary gear mechanism PG3. Then, a rotational speed of the ring gear Rb (the tenth element) of the second planetary gear mechanism PG2 to which the output member 13 is connected is "8$^{th}$" shown in FIG. 3, and the eighth gear is set.

In order to set a ninth gear, the two-way clutch F1 is put into a reverse rotation prevention state, the second brake B2 and the third brake B3 are put into a fixed state, and the first clutch C1 is put into a connected state. When the two-way clutch F1 is put into a reverse rotation prevention state, forward rotation of the third connected body Ca-Cb is allowed.

In addition, when the second brake B2 is put into a fixed state, a rotational speed of the sun gear Sd (the sixth element) of the fourth planetary gear mechanism PG4 is "0." In addition, when the third brake B3 is put into a fixed state, a rotational speed of the ring gear Rd (the fourth element) of the fourth planetary gear mechanism PG4 is "0." Therefore, elements Sd, Cd, and Rd of the fourth planetary gear mechanism PG4 are put into a locked state in which relative rotation is not possible, and a rotational speed of the first connected body Cc-Cd-Ra including the carrier Cd (the fifth element) of the fourth planetary gear mechanism PG4 is "0."

In addition, when the first clutch C1 is put into a connected state, a rotational speed of the third connected body Ca-Cb is "1" that is the same speed as a rotational speed of the sun gear Sc (the first element) of the third planetary gear mechanism PG3. Then, a rotational speed of the ring gear Rb (the tenth element) of the second planetary gear mechanism PG2 to which the output member 13 is connected is "9$^{th}$" shown in FIG. 3, and the ninth gear is set.

In order to set a tenth gear, the two-way clutch F1 is put into a reverse rotation prevention state, the third brake B3 is put into a fixed state, and the first clutch C1 and the second clutch C2 are put into a connected state. When the two-way clutch F1 is put into a reverse rotation prevention state, forward rotation of the third connected body Ca-Cb is allowed.

In addition, when the second clutch C2 is put into a connected state, the second connected body Rc-Sb and the sun gear Sd (the sixth element) of the fourth planetary gear mechanism PG4 rotate at the same speed. In addition, when the third brake B3 is put into a fixed state, a rotational speed of the ring gear Rd (the fourth element) of the fourth planetary gear mechanism PG4 is "0." In addition, when the first clutch C1 is put into a connected state, a rotational speed of the third connected body Ca-Cb is "1" that is the same speed as a rotational speed of the sun gear Sc (the first element) of the third planetary gear mechanism PG3. Then, a rotational speed of the ring gear Rd (the tenth element) of the second planetary gear mechanism PG2 to which the output member 13 is connected is "$10^{th}$" shown in FIG. 3, and the tenth gear is set.

In order to set a reverse gear, the two-way clutch F1 is put into a fixed state (L in FIG. 4), the second brake B2 is put into a fixed state, and the third clutch C3 is put into a connected state. When the second brake B2 is put into a fixed state and the third clutch C3 is put into a connected state, a rotational speed of the first connected body Cc-Cd-Ra is k/(k+1). In addition, when the two-way clutch F1 is put into a fixed state, a rotational speed of the third connected body Ca-Cb is "0." Then, a rotational speed of the ring gear Rb (the tenth element) of the second planetary gear mechanism PG2 to which the output member 13 is connected is reverse rotation "Rvs" shown in FIG. 3, and the reverse gear is set.

Here, speed lines indicated by dashed lines in FIG. 3 indicate that elements of other planetary gear mechanisms rotate (idle) following a planetary gear mechanism that transmits power among the four planetary gear mechanisms PG1 to PG4.

Figures 4, 5:
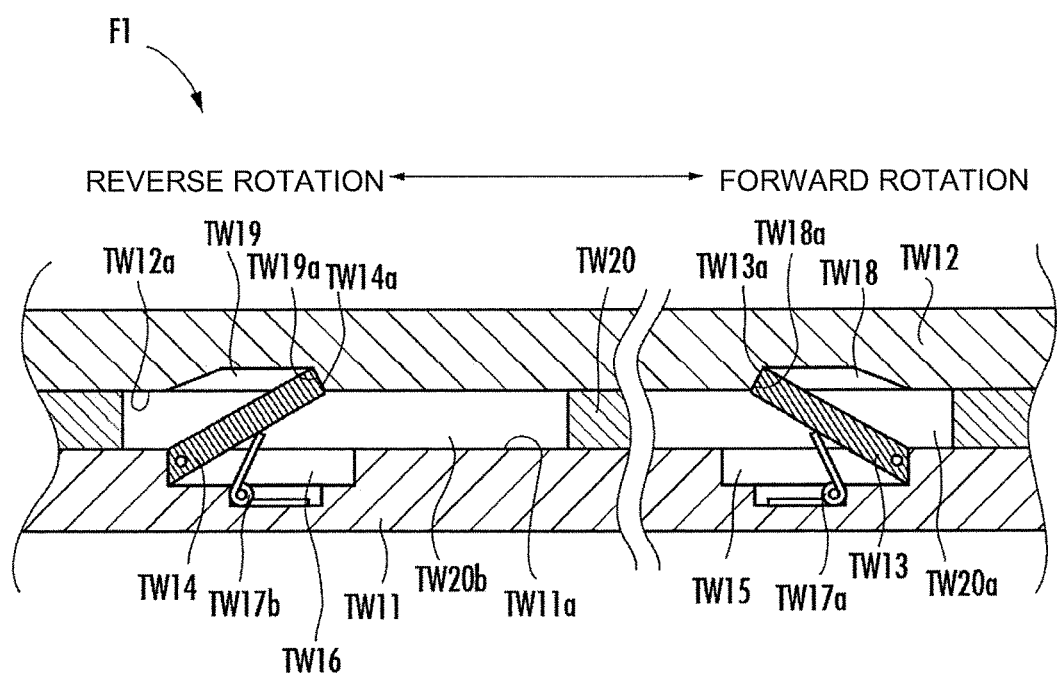
FIG. 4 is an explanatory diagram showing an engaged state of engagement mechanisms at gear stages of the present embodiment.
FIG. 5 is an explanatory diagram showing a fixed state of a two-way clutch of the present embodiment in a cross section.

FIG. 4 is a diagram collectively showing states of the clutches C1 to C3, the brakes B1 to B3, and the two-way clutch F1 at the above-described gear stages. "O" in the columns of the three clutches (first to third clutches C1 to C3), and the three brakes (first to third brakes B1 to B3) indicate a connected state or a fixed state, and blank columns indicate an open state. In addition, "R" in the column of the two-way clutch F1 indicates a reverse rotation prevention state and "L" indicates a fixed state.

In addition, the underlined "R" and "L" indicate that a rotational speed of the third connected body Ca-Cb is "0" due to the action of the two-way clutch F1. In addition, "R/L" indicates a state that is a reverse rotation prevention state "R" normally but switched to the fixed state "L" when an engine brake is effective.

In addition, FIG. 4 shows gear ratios (a rotational speed of the input shaft 11/a rotational speed of the output member 13) and common ratios (a ratio of gear ratios between gear stages; a value obtained by dividing a gear ratio of a predetermined gear stage by a gear ratio of a gear stage that is one speed level higher than the predetermined gear stage) at gear stages when a gear ratio h of the first planetary gear mechanism PG1 is 2.681, a gear ratio i of the second planetary gear mechanism PG2 is 1.914, a gear ratio j of the third planetary gear mechanism PG3 is 2.734, and a gear ratio k of the fourth planetary gear mechanism PG4 is 1.614. Accordingly, it can be understood that common ratios can be appropriately set.

Next, the two-way clutch F1 will be described in detail with reference to FIG. 5 to FIG. 8. The two-way clutch F1 is switchable between a fixed state in which the third connected body Ca-Cb is fixed to the transmission case 10 and a reverse rotation prevention state in which forward rotation of the third connected body Ca-Cb is allowed and reverse rotation is prevented.

Figure 6:
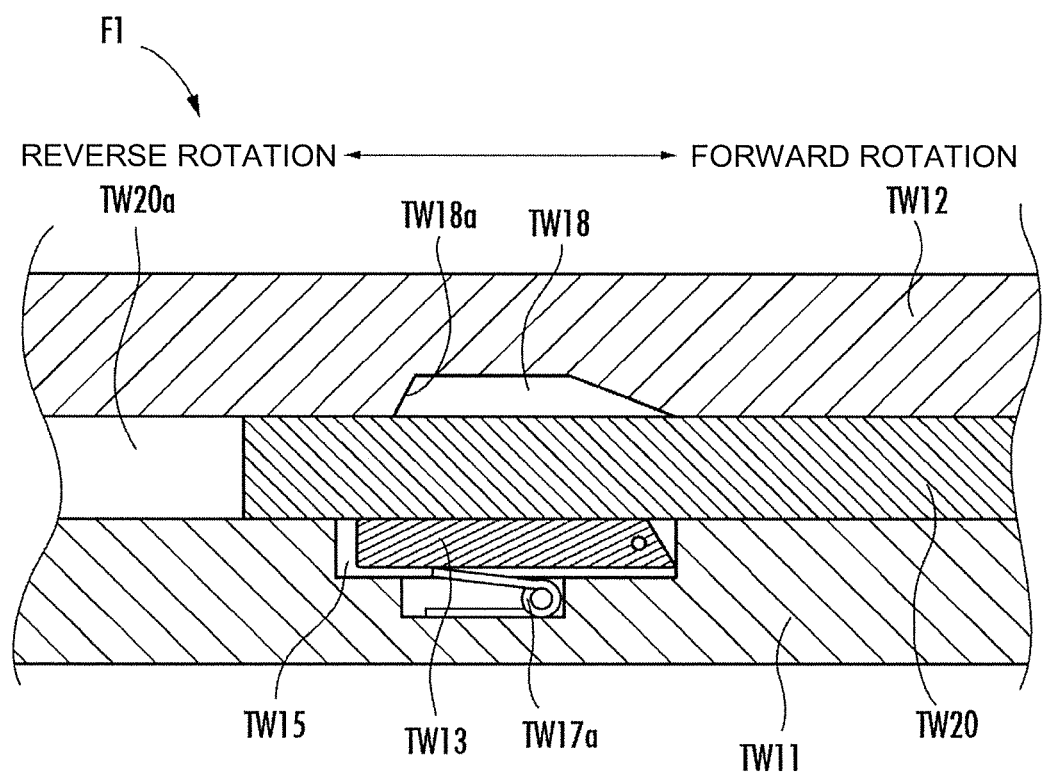
FIG. 6 is an explanatory diagram showing a reverse rotation prevention state of the two-way clutch of the present embodiment in a cross section.
Figure 7:
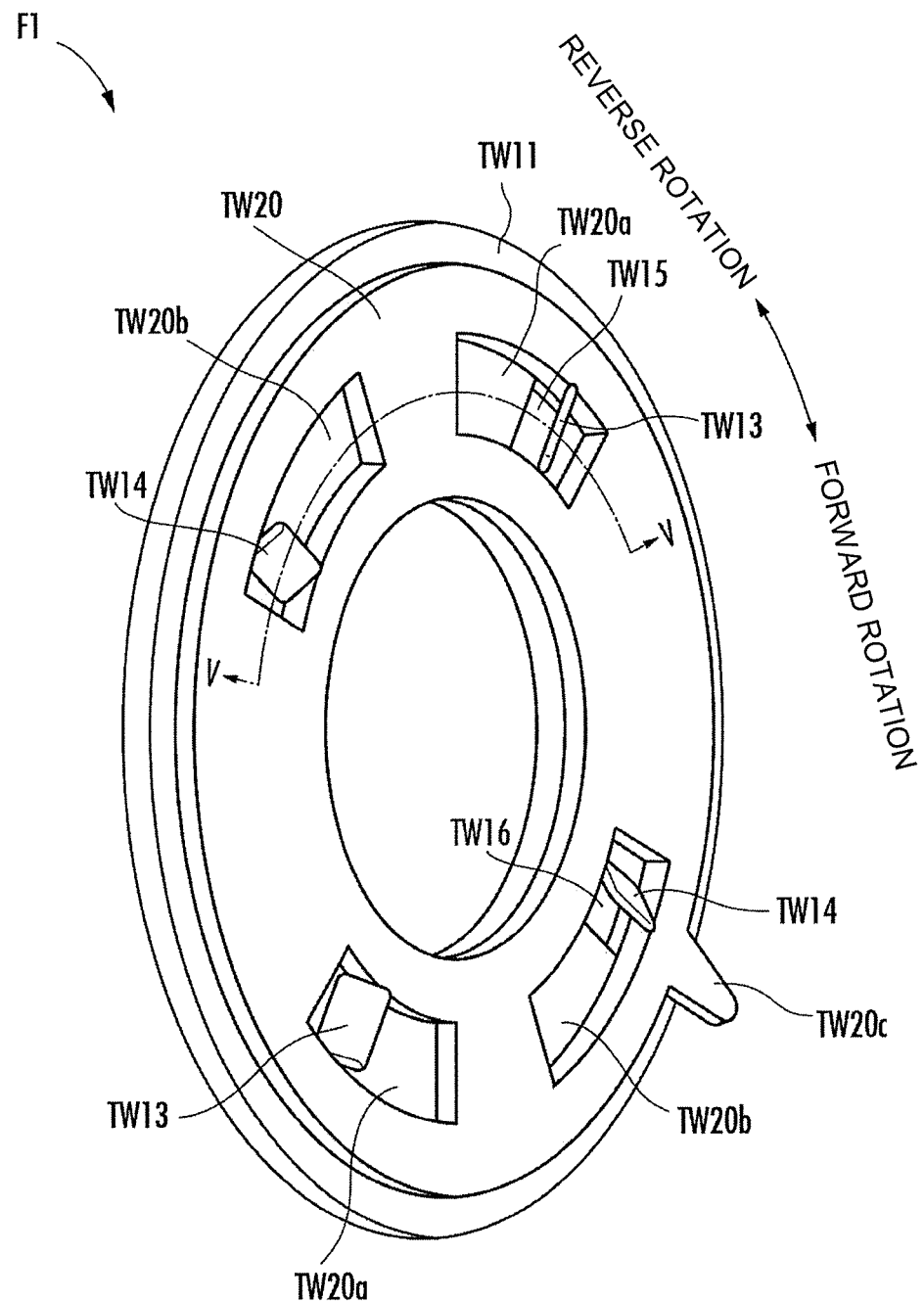
FIG. 7 is a perspective view showing a fixed state of the two-way clutch of the present embodiment.

As shown in cross sections in FIG. 5 and FIG. 6, the two-way clutch F1 includes a fixing plate TW11 and a rotating plate TW12 fixed to the transmission case 10. As shown in FIG. 7, the fixing plate TW11 is formed in a ring shape (donut shape). In addition, although not shown in FIG. 7, the rotating plate TW12 is formed in a ring shape (donut shape) similarly to the fixing plate TW11, and the fixing plate TW11 and the rotating plate TW12 are disposed concentrically.

As shown in FIG. 5, on a facing surface TW11a that faces the rotating plate TW12 on the fixing plate TW11, a plate-like forward rotation prevention side swinging part TW13 in which an end TW13a on the other side (a direction in which the rotating plate TW12 rotates reversely) in a circumferential direction swings using an end on one side (a direction in which the rotating plate TW12 rotates forward) in the circumferential direction of the fixing plate TW11 as a shaft, and a plate-like reverse rotation prevention side swinging part TW14 in which an end TW14a on one side (forward rotation direction) in the circumferential direction swings using an end of the other side (reverse rotation direction) in the circumferential direction of the fixing plate TW11 as a shaft are provided.

In addition, on the facing surface TW11a of the fixing plate TW11, concave accommodation units TW15 and TW16 in which the forward rotation prevention side swinging part TW13 and the reverse rotation prevention side swinging part TW14 can be accommodated are provided. On bottoms of the accommodation units TW15 and TW16, biasing members TW17a and TW17b including springs for biasing the swinging parts TW13 and TW14 are provided so that the swinging ends TW13a and TW14a of the corresponding swinging parts TW13 and TW14 protrude from the accommodation units TW15 and TW16.

On a facing surface TW12a that faces the fixing plate TW11 on the rotating plate TW12, holes TW18 and TW19 are provided at positions corresponding to the swinging parts TW13 and TW14. At the first hole TW18 provided at a position corresponding to the forward rotation prevention side swinging part TW13, a first engagement part TW18a having a stepped shape that can be engaged with the swing end TW13a of the forward rotation prevention side swinging part TW13 is provided such that it is positioned on the other side (a reverse rotation direction side) in the circumferential direction of the rotating plate TW12.

At the second hole TW19 provided at a position corresponding to the reverse rotation prevention side swinging part TW14, a second engagement part TW19a having a stepped shape that can be engaged with the swing end TW14a of the reverse rotation prevention side swinging part TW14 is provided such that it is positioned on one side (a forward rotation direction side) in the circumferential direction of the rotating plate TW12.

As shown in FIG. 5 and FIG. 7, when the end TW13a of the forward rotation prevention side swinging part TW13 and the first engagement part TW18a are engageable and the end TW14a of the reverse rotation prevention side swinging part TW14 and the second engagement part TW19a are engageable, both forward rotation and reverse rotation of the rotating plate TW12 are prevented. Accordingly, a state in which the ends TW13a and TW14a and the engagement parts TW18a and TW19a corresponding thereto are engaged with each other is the fixed state in the two-way clutch F1 of the present embodiment.

A switch plate TW20 is interposed between the fixing plate TW11 and the rotating plate TW12. As shown in FIG. 7, the switch plate TW20 is formed in a ring shape (donut shape). On the switch plate TW20, notch holes TW20a and TW20b are provided at positions corresponding to the swinging parts TW13 and TW14.

Figure 8:
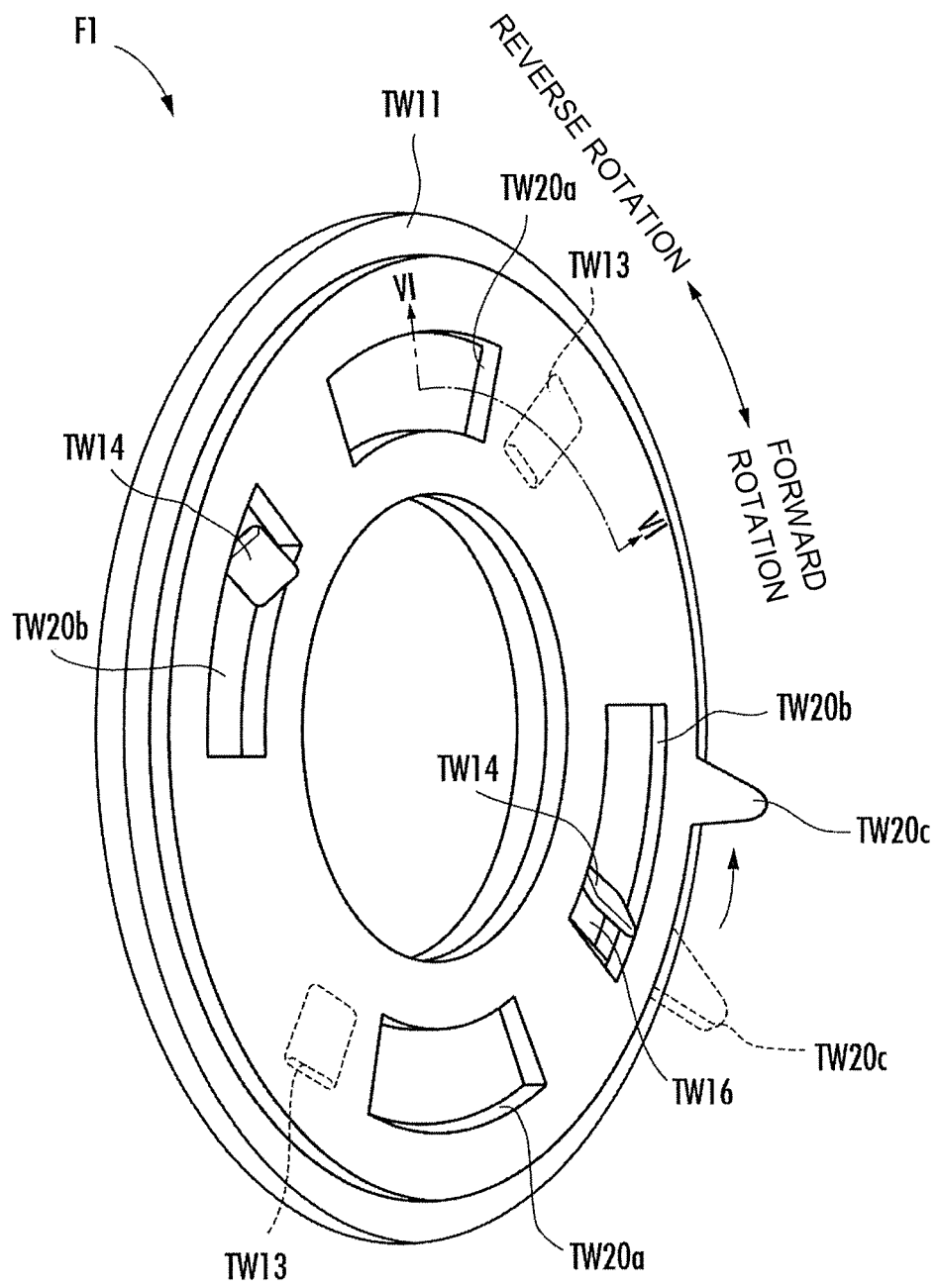
FIG. 8 is a perspective view showing a reverse rotation prevention state of the two-way clutch of the present embodiment.

A protrusion TW20c that protrudes radially outward is provided at the outer edge of the switch plate TW20. As shown in FIG. 8, the switch plate TW20 is freely swingable with respect to the fixing plate TW11.

When the switch plate TW20 is swung from the fixed state shown in FIG. 7 to the state shown in FIG. 8, as shown in FIG. 6, the first notch hole TW20a corresponding to the forward rotation prevention side swinging part TW13 exceeds the forward rotation prevention side swinging part TW13, and the forward rotation prevention side swinging part TW13 is pushed to the switch plate TW20 against the biasing force of the biasing member TW17a, and is accommodated in the accommodation unit TW15. Accordingly, engagement of the end TW13a of the forward rotation prevention side swinging part TW13 and the first engagement part TW18a is prevented. Accordingly, rotation of the rotating plate TW12 on the forward rotation side is allowed.

In addition, as shown in FIG. 8, in the second notch hole TW20b corresponding to the reverse rotation prevention side swinging part TW14, even if the switch plate TW20 is swung from the fixed state shown in FIG. 7 to the state shown in FIG. 8, the end TW14a can be engaged with the second engagement part TW19a without accommodating the reverse rotation prevention side swinging part TW14 in the accommodation unit TW16.

Accordingly, the state shown in FIG. 6 and FIG. 8 is a reverse rotation prevention state in the two-way clutch F1 of the present embodiment.

Figure 9:
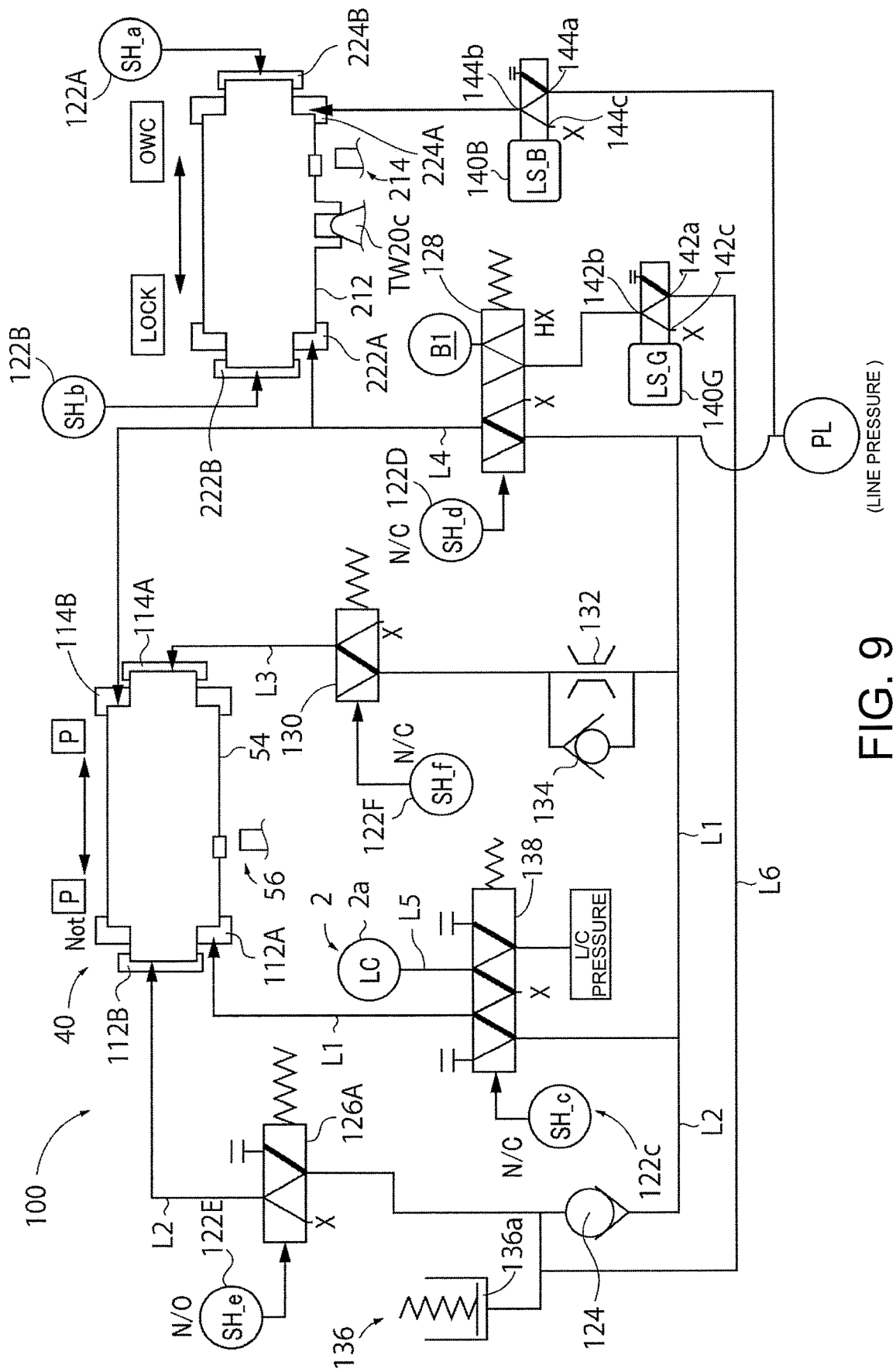
FIG. 9 is an explanatory diagram showing the automatic transmission of the present embodiment.

Next, a hydraulic control device 100 included in the automatic transmission 3 of the present embodiment will be described with reference to FIG. 9. As shown in FIG. 9, the hydraulic control device 100 controls operations of the parking piston 54 of the parking lock mechanism 40.

The hydraulic control device 100 includes an on and off type solenoid valve 122C configured to supply a line pressure supplied from a hydraulic pump (not shown) to an oil passage L1 to a first locking oil chamber 112A and an on and off type solenoid valve 122E configured to supply a line pressure of an oil passage L2 connected to a downstream side of the oil passage L1 to a second locking oil chamber 112B. A check valve 124 is interposed in the oil passage L2 at a position upstream from the solenoid valve 122E. When the solenoid valve 122C is opened, a line pressure is directly supplied to the first locking oil chamber 112A. When the solenoid valve 122E is opened, a first ball valve 126A is opened. The solenoid valve 122C is a normally closed type, and the solenoid valve 122E is a normally open type.

In addition, the hydraulic control device 100 includes an on and off type solenoid valve 122F configured to supply a line pressure to a first unlocking oil chamber 114A through an oil passage L3 and an on and off type solenoid valve 122D configured to supply a line pressure of an oil passage L4 branched upstream from the check valve 124 to a second unlocking oil chamber 114B.

A line pressure is directly supplied to the second unlocking oil chamber 114B through a brake cut valve 128 that is operated by the solenoid valve 122D.

When the solenoid valve 122F is opened, a spool of a parking inhibit valve 130 moves to the right side in FIG. 9 against a biasing force of the spring, and thus a line pressure is supplied to the first unlocking oil chamber 114A. On the other hand, when the solenoid valve 122F is closed, a spool of the parking inhibit valve 130 is biased due to the spring and moves to the left side in FIG. 9, and thus a line pressure of the first unlocking oil chamber 114A is drained. The solenoid valve 122F is a normally closed type, and the solenoid valve 122D is a normally closed type.

A second choke 132 narrowing a flow path is provided upstream from the parking inhibit valve 130 of the oil passage L3. The second choke 132 is constituted by a slot groove of a separation plate. In this manner, when the second choke 132 is constituted by a slot groove of a separation plate, there is no need to separately provide a second choke member, it is possible to reduce the number of components, and it is possible to simply assembly of the parking lock device.

In addition, a second check valve 134 is provided in parallel to the second choke 132 and prevents supply of hydraulic pressure to the first unlocking oil chamber 114A and allows release of hydraulic pressure from the first unlocking oil chamber 114A. When the second check valve 134 is provided, it is possible to quickly release hydraulic pressure.

An accumulation chamber 136a of an accumulator 136 is connected to the oil passage L2 between the check valve 124 and the solenoid valve 122E.

A lock-up clutch shift valve 138 is connected to the oil passage L1 downstream from the solenoid valve 122C, and a lock-up clutch pressure of an oil passage L5 is supplied to a lock-up clutch 2a of the torque converter 2 which is a start mechanism through the lock-up clutch shift valve 138.

In addition, the first brake B1 is connected to an oil passage L6 which is a hydraulic engagement device for shifting downstream from the check valve 124, and a linear solenoid valve 140G and the brake cut valve 128 are disposed on the oil passage L6. Opening and closing of the brake cut valve 128 are driven by the solenoid valve 122D. The linear solenoid valve 140G includes an import 142a, an outport 142b, and a drain port 142c and can adjust hydraulic pressure input from the import 142a and output it from the outport 142b, and release hydraulic pressure from the outport 142b through the drain port 142c.

In addition, the hydraulic control device 100 includes a two-way piston 212 that is engaged with the protrusion TW20c of the switch plate TW20 of the two-way clutch F1 and switches the switch plate TW20 between a reverse rotation prevention state and a fixed state by hydraulic pressure.

In the two-way piston 212, similarly to the parking piston 54, at one end of the two-way piston 212 accommodated in a cylinder (not shown), a first reverse rotation prevention oil chamber 222A and a second reverse rotation prevention oil chamber 222B for moving the two-way piston 212 to a side in a reverse rotation prevention state ("OWC" in FIG. 9) are provided.

At the other end of the two-way piston 212, a first fixing oil chamber 224A and a second fixing oil chamber 224B for moving the two-way piston 212 to a side in a fixed state ("LOCK" in FIG. 9) are provided.

The first reverse rotation prevention oil chamber 222A is connected to the oil passage L4. A line pressure can be supplied to the second reverse rotation prevention oil chamber 222B through a solenoid valve 122B. A line pressure can be supplied to the first fixing oil chamber 224A through a linear solenoid valve 140B.

The linear solenoid valve 140B includes an import 144a, an outport 144b, and a drain port 144c, and can adjust a line pressure input from the import 144a and output it from the outport 144b, and release hydraulic pressure from the outport 144b through the drain port 144c.

A line pressure can be supplied to the second fixing oil chamber 224B through a solenoid valve 122A.

Next, operations of the present embodiment having the above configuration will be described.

When a driver selects a D range or a R range using a shift operation unit such as a shift lever and a vehicle travels at a predetermined gear stage, a line pressure generated by a hydraulic pump driven by the internal combustion engine is transmitted to the oil passage L1 and the oil passage L3, and hydraulic pressure of the oil passage L1 is transmitted to the oil passage L2, the oil passage L4, and the oil passage L6 through the check valve 124. The line pressure is supplied to the oil passage L2 and the hydraulic pressure accumulates in the accumulation chamber 136a of the accumulator 136.

The normally closed type solenoid valve 122F is excited by energization and is opened, and the normally closed type solenoid valve 122D is also excited by energization and is opened. Then, when the solenoid valve 122F is opened, the spool of the parking inhibit valve 130 moves to the right side in FIG. 9, and a line pressure of the oil passage L3 is transmitted to the first unlocking oil chamber 114A through the parking inhibit valve 130. In addition, when the solenoid valve 122D is opened, a line pressure of the oil passage L4 is transmitted to the second unlocking oil chamber 114B.

On the other hand, the normally closed type solenoid valve 122C is closed when power supply is stopped, and the normally open type solenoid valve 122E is excited by energization and closed. Then, when the solenoid valve 122C is closed, oil in the first locking oil chamber 112A is drained from the solenoid valve 122, and when the solenoid valve 122E is closed, the first ball valve 126A is closed and thus oil in the second locking oil chamber 112B is drained from the first ball valve 126A. As a result, the parking piston 54 moves to the left side in FIG. 9 and parking lock is released (parking released state).

While a flow rate of oil that can pass through the solenoid valve 122E is relatively low, a flow rate of oil that can pass through the first ball valve 126A that is opened or closed by the solenoid valve 122E is relatively high. Therefore, it is possible to improve operational responsiveness of the parking piston 54 by interposing the first ball valve 126A.

As described above, while the vehicle travels, the solenoid valve 122C and the solenoid valve 122E are closed and the solenoid valve 122F and the solenoid valve 122D are opened so that the parking piston 54 is operated at an unlock position and parking lock can be released (parking released state).

In addition, the parking lock mechanism 40 includes two locking oil chambers (the first locking oil chamber 112A and the second locking oil chamber 112B) at one end of the parking piston 54 and includes two unlocking oil chambers (the first unlocking oil chamber 114A and the second unlocking oil chamber 114B) at the other end thereof. Thereof, even if one of the solenoid valve 122F and the solenoid valve 122D is fixed in a closed state, and no hydraulic pressure is supplied to the first unlocking oil chamber 114A or the second unlocking oil chamber 114B, or even if one of the solenoid valve 122C and the solenoid valve 122E is fixed in an open state, and hydraulic pressure is supplied to the first locking oil chamber 112A or the second locking oil chamber 112B, it is possible to operate the parking piston 54 at an unlock position (notP position, a parking released state) without problem and ensure redundancy.

Here, the solenoid valve 122F is opened at a first predetermined gear stage and the solenoid valve 122D is opened at a second predetermined gear stage, and the first predetermined gear stage and the second predetermined gear stage partially overlap. Therefore, according to a gear stage set at this time, there are cases in which a line pressure is supplied to only the first unlocking oil chamber 114A, a line pressure is supplied to only the second unlocking oil chamber 114B, and a line pressure is supplied to both the first unlocking oil chamber 114A and the second unlocking oil chamber 114B. However, in all of the cases, since the parking piston 54 moves to the left side in FIG. 9 and parking lock is released, there is no problem. Then, in an overlapping gear stage, since a line pressure is supplied to both the first unlocking oil chamber 114A and the second unlocking oil chamber 114B, even if the solenoid valve 122F or the solenoid valve 122D fails and supply of a line pressure is stopped, parking lock remains in a deactivated state (parking released state) and redundancy is enhanced.

When the shift operation unit such as a shift lever is operated in a P range and a vehicle is stopped while the internal combustion engine operates, the solenoid valve 122C and the solenoid valve 122E are opened, and the solenoid valve 122F and the solenoid valve 122D are closed. When the solenoid valve 122C is opened, a line pressure of the oil passage L1 is transmitted to the first locking oil chamber 112A, and when the solenoid valve 122E is opened, the first ball valve 126A is opened and a line pressure of the oil passage L2 is transmitted to the second locking oil chamber 112B.

On the other hand, when the solenoid valve 122F is closed, hydraulic oil in the first unlocking oil chamber 114A is discharged from the parking inhibit valve 130, and when the solenoid valve 122D is closed, hydraulic oil in the second unlocking oil chamber 114B is discharged from the solenoid valve 122D. As a result, the parking piston 54 moves to the right side in FIG. 3 and parking lock operates (parking locked state).

As described above, when the driver selects the P range using the shift operation unit while the internal combustion engine operates, the solenoid valve 122C and the solenoid valve 122E are opened, and the solenoid valve 122F and the solenoid valve 122D are closed. Therefore, the parking piston 54 can be operated at a parking lock position. In this case, since the parking lock mechanism 40 includes two locking oil chambers (the first locking oil chamber 112A and the second locking oil chamber 112B) and two unlocking oil chambers (the first unlocking oil chamber 114A and the second unlocking oil chamber 114B, even if one of the solenoid valve 122F and the solenoid valve 122D is fixed in an open state, and hydraulic pressure is supplied to the first unlocking oil chamber 114A or the second unlocking oil chamber 114B, or one of the solenoid valve 122C and the solenoid valve 122E is fixed in a closed state and no hydraulic pressure is supplied to the first locking oil chamber 112A or the second locking oil chamber 112B, it is possible to operate the parking piston 54 at a parking lock position (P position) without problem and ensure redundancy (parking locked state).

When the shift operation unit is operated in the P range and ignition (vehicle power source) is turned off, the internal combustion engine is stopped and thus a line pressure due to the pump driven by the internal combustion engine is removed. However, according to the present embodiment, the parking lock mechanism 40 is operated due to hydraulic pressure accumulated in the accumulator 136 without problem, and can be put into a parking locked state.

Then, when the solenoid valve 122E is opened, hydraulic pressure of the accumulator 136 is transmitted to the second locking oil chamber 112B. On the other hand, when the solenoid valve 122F is closed, hydraulic oil in the first unlocking oil chamber 114A is discharged from the parking inhibit valve 130, and when the solenoid valve 122D is closed, hydraulic oil in the second unlocking oil chamber 114B is discharged from the solenoid valve 122D. As a result, the parking piston 54 moves to the right side in FIG. 9 and parking lock operates (parking locked state).

As described above, even if the P range is selected using the shift operation unit to turn ignition off and thus a line pressure is removed, the parking lock mechanism 40 can be operated due to hydraulic pressure accumulated in the accumulator 136 without problem (parking locked state).

In addition, the vehicle of the present embodiment can perform idling stop control, and the internal combustion engine stops during temporary stop such as during signal waiting, the pump also stops and a line pressure is removed.

Even if the internal combustion engine starts as return from idling stop control, since a line pressure does not immediately rise, it is not possible to supply hydraulic pressure to the first brake B1 which is a hydraulic engagement device necessary for starting, and prompt starting may be inhibited. However, according to the present embodiment, it is possible to operate the first brake B1 without delay at hydraulic pressure of the accumulator 136 remained in idling stop control.

More specifically, hydraulic pressure accumulated in the accumulator 136 is supplied from the oil passage L2 to the oil passage L6 at the same time as return from idling stop control. In this case, since the solenoid valve 122D interposed in the oil passage L4 is opened when power supply is stopped, a spool of the brake cut valve 128 moves to the left side in FIG. 9. Therefore, when the linear solenoid valve 140G interposed in the oil passage L6 is opened to a predetermined degree of opening, hydraulic pressure accumulated in the accumulator 136 can be supplied to the first brake B1 and the vehicle can be started promptly.

While the operations of the first brake B1 as return from idling stop control have been described above, the brake cut valve 128 can be operated by the solenoid valve 122D to control the first brake B1 even while the vehicle travels normally. When the spool of the brake cut valve 128 moves to the left side in FIG. 9, communication between the linear solenoid valve 140G and the first brake B1 is blocked and the solenoid valve 122D is closed, and supply of hydraulic pressure to the second unlocking oil chamber 114B is blocked. However, since it remains at an unlock position due to hydraulic pressure supplied to the first unlocking oil chamber 114A, there is no risk of parking lock being operated (parking released state).

In addition, according to the present embodiment, the solenoid valve 122C is also used for operating the lock-up clutch 2a of the torque converter 2. That is, while the vehicle travels, since the solenoid valve 122C is closed, a spool of the lock-up clutch shift valve 138 moves to the right side in FIG. 9, and a lock-up clutch pressure is supplied to the lock-up clutch 2a of the torque converter 2. When the solenoid valve 122C is opened in this state, the spool of the lock-up clutch shift valve 138 moves to the right side in FIG. 9 and hydraulic pressure of the lock-up clutch 2a is discharged. Therefore, the lock-up clutch 2a can be disengaged.

When the solenoid valve 122C is opened, a line pressure is supplied to the first locking oil chamber 112A. However, in this case, since a line pressure is supplied to both the first unlocking oil chamber 114A and the second unlocking oil chamber 114B, even if a line pressure is supplied to the first locking oil chamber 112A, the parking piston 54 does not move to a parking lock position, and there is no risk of parking lock being operated.

As described above, according to the parking lock mechanism 40 of the present embodiment, since the solenoid valve 122C and the solenoid valve 122D that control operations of the parking piston 54 are also used for control of the lock-up clutch 2a of the torque converter 2 and control of the first brake B1, it is possible to reduce the number of solenoid valves and it is possible to simply the structure of the hydraulic control device 100. In addition, since the accumulator 136 is used not only for operation of parking lock but also for operation of the first brake B1 which is a hydraulic engagement device as return from idling stop control, it is possible to reduce the number of accumulators and it is possible to further simplify the structure of the hydraulic control device 100.

Functions of the hydraulic control device 100 as a control unit are also performed by the transmission control device ECU. The transmission control device ECU can receive current shift position information and shift switching request information based on an operation performed by the driver using an operation unit.

In addition, the transmission control device ECU receives a parking input request instruction signal. Here, it is determined whether a parking input is necessary based on predetermined vehicle information such as a travel speed of a vehicle that the control unit itself has received and a parking input instruction signal (or a parking input instruction flag) may be issued.

In addition, in the transmission control device ECU, a countdown timer is provided, a numerical value is reduced from a preset initial value as the time passes.

In addition, the transmission control device ECU can receive a signal of a stroke sensor 56 provided at the parking piston 54 and determine whether the parking piston 54 is positioned on a parking lock side or release side.

Next, a reverse side preparation mode (R preparation) of the automatic transmission 3 of the present embodiment will be described with reference to FIG. 10 and FIG. 11. In the reverse side preparation mode, when a shift position is switched from a parking range (P range) to a reverse range (R range) according to an operation of the shift operation unit such as a shift lever, main processing is performed when the range transitions to the reverse range (R range). In addition, the reverse side preparation mode (R preparation) is performed for a predetermined cycle time.

Figure 10:
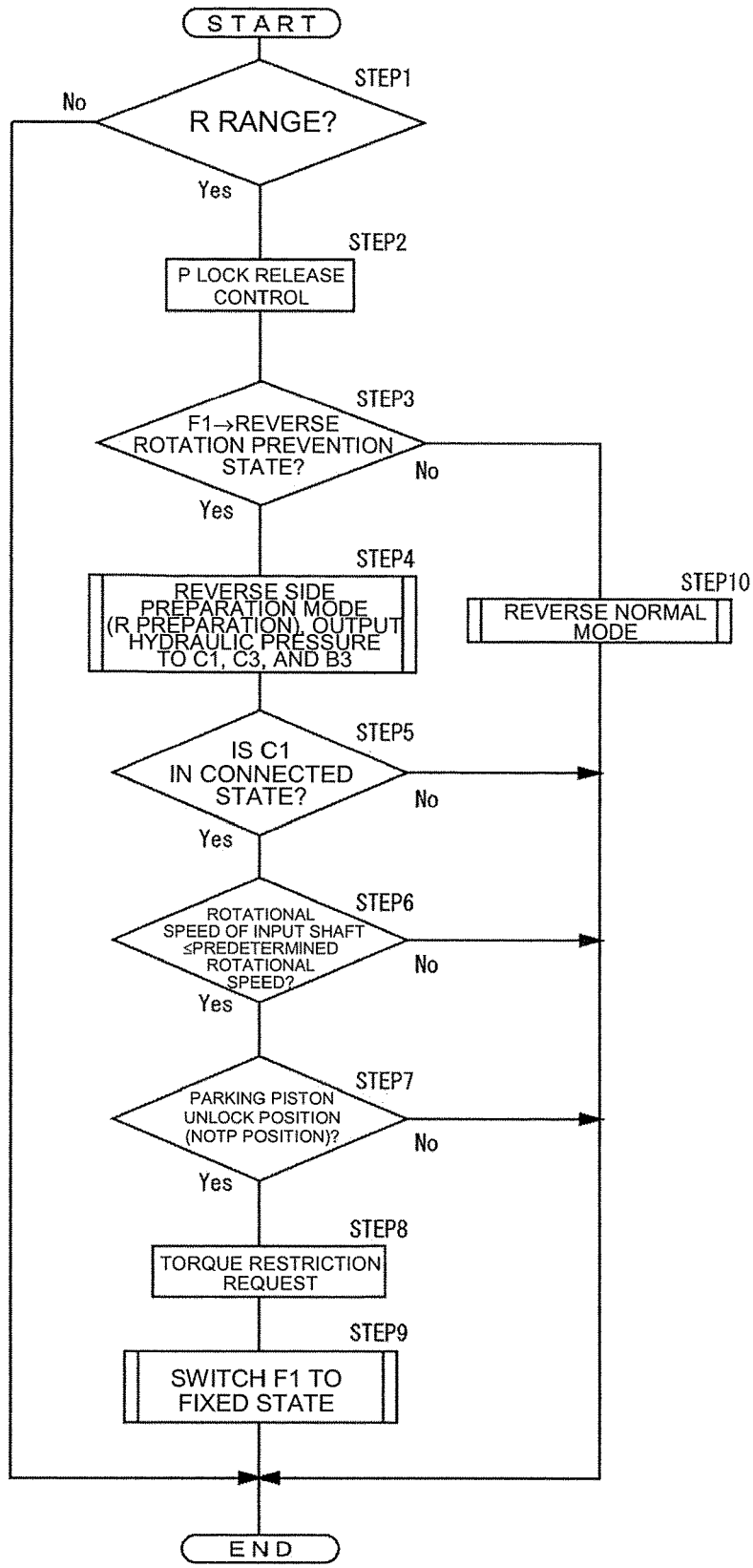
FIG. 10 is a flowchart showing operations of a control unit when a reverse side preparation mode in the automatic transmission of the present embodiment is performed.

As shown in FIG. 10, in STEP1, it is checked whether the range is switched from the parking range (P range) to the reverse range (R range). When the range is not switched to the reverse range (R range) (NO in STEP1), the process at this time ends.

When the range is switched to the reverse range (R range) (YES in STEP1), the process advances to STEP2, and it is determined whether a parking (P) state is released and a parking released state is reached. When the state is not a parking released state, P lock release control for switching the state from a parking locked state to a parking released state starts. Here, when the state is a parking released state in STEP2, since the P lock release control is completed, the process advances to STEP3 without starting the P lock release control.

Figure 11:
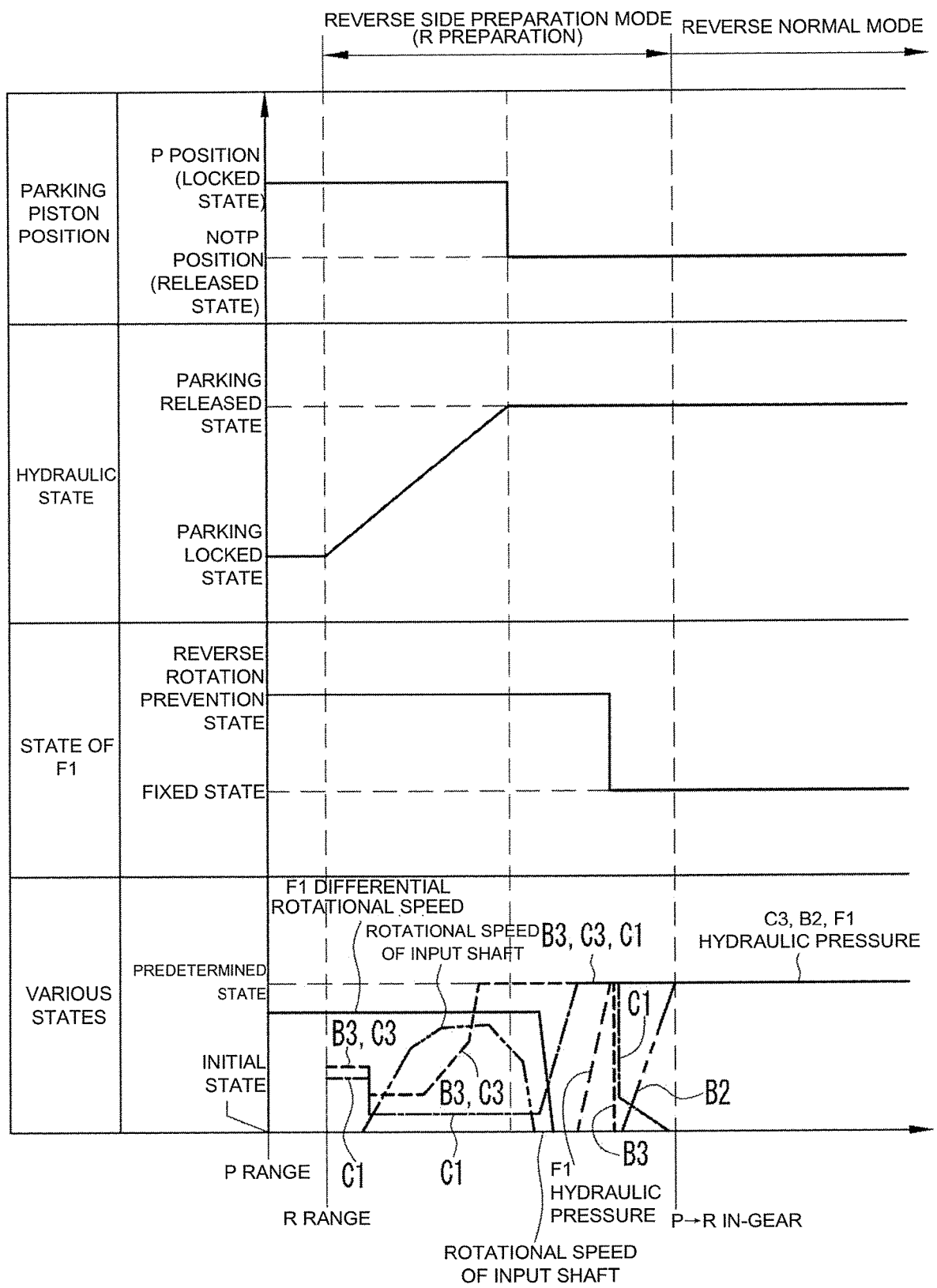
FIG. 11 is a time chart showing operation conditions of components when the reverse side preparation mode in the automatic transmission of the present embodiment is performed.

In the P lock release control in STEP2, the hydraulic control device 100 supplies (outputs) hydraulic pressure, operates the parking piston 64 of the parking lock mechanism 40 from a parking lock position (P position, parking locked state) to an unlock position (notP position, parking released state), and switches the automatic transmission 3 from a parking locked state to a parking released state (refer to FIG. 11).

In addition, in parallel with STEP2, in STEP3, it is checked whether the two-way clutch F1 is in a reverse rotation prevention state.

When the two-way clutch F1 is in a reverse rotation prevention state (YES in STEP3), the process advances to STEP4, hydraulic pressure is supplied (output) to the first clutch C1, the third clutch C3, and the third brake B3, and the process in the reverse side preparation mode (R preparation) starts.

In the reverse side preparation mode (R preparation) in STEP4, the third clutch C3 is switched from an open state to a connected state, and the third brake B3 is switched from an open state to a fixed state (refer to FIG. 11).

In addition, in the reverse side preparation mode (R preparation) in STEP4, when the third clutch C3 is switched to a connected state and the third brake B3 is switched to a fixed state, rotation of the input shaft 11 is stopped. After rotation of the input shaft 11 is stopped, the first clutch C1 is switched to a connected state (refer to FIG. 11).

Here, the initial state shown in FIG. 11, the second brake B2 and the third brake B3 are in an open state, the first clutch C1 and the third clutch C3 are in an open state, the two-way clutch F1 hydraulic pressure is in a hydraulic state in which the two-way clutch F1 is put into a reverse rotation prevention state, and a rotational speed of the input shaft is 0. In addition, in the predetermined state shown in FIG. 11, the second brake B2 and the third brake B3 are in a fixed state, the first clutch C1 and the third clutch C3 are in a connected state, the two-way clutch F1 hydraulic pressure is in a hydraulic state in which the two-way clutch F1 is put into a fixed state, and a rotational speed of the input shaft is a predetermined rotational speed.

After STEP4, the process advances to STEP5, and it is determined whether the first clutch C1 is in a connected state. When the first clutch C1 is not in a connected state (NO in STEP5), the process at this time ends.

When the first clutch C1 is in a connected state (YES in STEP5), the process advances to STEP6, and it is determined whether a rotational speed of the input shaft 11 detected by a sensor 14 is equal to or lower than a predetermined rotational speed (for example, 0).

When a rotational speed of the input shaft 11 is greater than a predetermined rotational speed (NO in STEP6), the process at this time ends.

When a rotational speed of the input shaft 11 is equal to or lower than a predetermined rotational speed (YES in STEP6), the process advances to STEP7, and it is determined whether the parking piston 54 of the parking lock mechanism 40 is at an unlock position (notP position, parking released state).

When the parking piston 54 is not at an unlock position (notP position, parking released state) but is at a parking lock position (P position, parking locked state) (NO in STEP7), the process at this time ends.

When the parking piston 54 is at an unlock position (notP position, parking released state) (YES in STEP7), the process advances to STEP5, and the driving source ENG is requested to restrict an output torque in order to prevent a torque from significantly increasing. Then, the process advances to STEP9, hydraulic pressure is supplied (output) to the two-way clutch F1, and the two-way clutch F1 is switched from a reverse rotation prevention state to a fixed state.

In addition, in STEP9, as shown in FIG. 11, after the two-way clutch F1 is switched from a reverse rotation prevention state to a fixed state, the third brake B3 is switched from a fixed state to an open state, the first clutch C1 is switched from a connected state to an open state, and additionally, the second brake B2 is switched from an open state to a fixed state.

If the two-way clutch F1 is switched from a reverse rotation prevention state to a fixed state in STEP9, when the process of the flowchart in FIG. 10 is performed next, since the two-way clutch F1 is in a fixed state in STEP3 (NO in STEP3), the process branches to STEP10. Then, in STEP10, execution of a normal reverse range process (reverse normal mode) starts, and the process at this time ends. Here, in the reverse normal mode after the process in the reverse side preparation mode (R preparation) ends, after an in-gear process (P→FR in-gear) on the reverse side is performed, a process in a reverse steady state (R steady state) is performed.

In this manner, in the present embodiment, when a shift position is switched from the parking range (P range) to the reverse range (R range) according to an operation of the shift operation unit such as a shift lever, P lock release control and reverse side preparation control are performed at the same time. Therefore, compared to a case in the related art in which P lock release control is performed, the state is put into a parking released state, and reverse side preparation control is then performed, it is possible to shorten a transition time from when a shift position is switched from the parking range (P range) to the reverse range (R range) until the mode transitions to a reverse normal mode in which reverse driving can be performed, and it is possible to improve responsiveness.

In addition, in the parking locked state, when the two-way clutch F1 is switched from a reverse rotation prevention state to a fixed state, the P lock release control and the reverse side preparation mode are performed, and additionally, the two-way clutch F1 is switched from a reverse rotation prevention state to a fixed state at the same time, a discharge amount of an oil pump configured to supply hydraulic pressure may be insufficient. When a discharge amount of the oil pump is insufficient, one of the first clutch C1, the third clutch C3, and the third brake B3 slips and differential rotation of the two-way clutch F1 occurs (the two-way clutch F1 rotates). In a period in which differential rotation of the two-way clutch F1 occurs, when the two-way clutch F1 is switched from a reverse rotation prevention state to a fixed state, the two-way clutch F1 may be damaged.

In the present embodiment, as shown in FIG. 11, after the state is switched from a parking locked state to a parking released state, the two-way clutch F1 is switched from a reverse rotation prevention state to a fixed state. Accordingly, since a discharge amount of the oil pump is sufficient, differential rotation of the two-way clutch F1 does not occur, and the two-way clutch F1 is not damaged.

Here, the automatic transmission 3 of the planetary gear mechanism has been described in the present embodiment. However, the automatic transmission of the disclosure is not limited thereto. For example, a parallel shaft type automatic transmission and a dual clutch transmission (for example, an automatic transmission that switches between one planetary gear mechanism and two manual transmissions using two clutches) may be used.

What is claimed is:

1. An automatic transmission, comprising:
an input unit which is disposed inside a housing and to which power of a driving source is transmitted;
planetary gear mechanisms including a plurality of elements that are rotatable inside the housing;
a plurality of engagement mechanisms, each of a part of the engaagement mechanisms is for connecting one of the elements to another of the elements in a connected state, and each of another part of the engagement mechanisms is for connecting one of the elements to the housing in a fixed state;
an output unit;
a parking lock mechanism; and
a control unit configured to control the parking lock mechanism and the engagement mechanisms,
wherein the automatic transmission is configured to shift rotation of the input unit to a plurality of stages and output it from the output unit, and the automatic transmission comprises:
a switching mechanism that is switchable between a reverse rotation prevention state in which forward rotation of one element among the plurality of elements is allowed and reverse rotation is prevented and a fixed state in which the element is fixed to the housing,
wherein when a shift position is in a reverse range, the switching mechanism is put into the fixed state by the control unit,
when the shift position is switched from a parking range to the reverse range, the control unit is able to perform a parking release control in which, a parking state of the parking lock mechanism is released, and a reverse side preparation mode in which, when one of the engagement mechanisms is put into the connected state or another one of the engagement mechanisms is put into the fixed state, a rotational speed of the element fixed by the switching mechanism is set to a predetermined rotational speed or lower, and
the control unit performs the parking release control and the reverse side preparation mode at the same time.

2. The automatic transmission according to claim 1, wherein the planetary gear mechanisms comprise first to fourth planetary gear mechanisms each including three elements including a sun gear, a carrier, and a ring gear;
the three elements of the third planetary gear mechanism are a first element, a second element, and a third element in an arrangement order at intervals corresponding to a gear ratio in a collinear diagram that is able to express a relative rotation speed ratio by a straight line,
the three elements of the fourth planetary gear mechanism are a fourth element, a fifth element, and a sixth element in an arrangement order at intervals corresponding to a gear ratio in a collinear diagram,
the three elements of the first planetary gear mechanism are a seventh element, an eighth element, and a ninth element in an arrangement order at intervals corresponding to a gear ratio in a collinear diagram,
the three elements of the second planetary gear mechanism are a tenth element, an eleventh element, and a twelfth element in an arrangement order at intervals corresponding to a gear ratio in a collinear diagram,
the first element is connected to the input unit, the tenth element is connected to the output unit, the second element, the fifth element, and the ninth element are connected to form a first connected body, the third element and the twelfth element are connected to form a second connected body, and the eighth element and the eleventh element are connected to form a third connected body,
the plurality of engagement mechanisms includes three clutches comprising first to third clutches, three brakes comprising first to third brakes, and a two-way clutch,
the first clutch is switchable between a connected state in which the first element and the third connected body are connected and an open state in which the connection is disconnected,
the second clutch is switchable between a connected state in which the sixth element and the second connected body are connected and an open state in which the connection is disconnected,
the third clutch is switchable between a connected state in which the first element and the fourth element are connected and an open state in which the connection is disconnected,
the first brake is switchable between a fixed state in which the seventh element is fixed to the housing and an open state in which the fixed state is released,
the second brake is switchable between a fixed state in which the sixth element is fixed to the housing and an open state in which the fixed state is released,
the third brake is switchable between a fixed state in which the fourth element is fixed to the housing and an open state in which the fixed state is released,
the two-way clutch is switchable between a reverse rotation prevention state in which forward rotation of the third connected body is allowed and reverse rotation is prevented and a fixed state in which rotation of the third connected body is prevented,
the switching mechanism includes the two-way clutch, and
the control unit switches the two-way clutch from the reverse rotation prevention state to the fixed state when the parking release control is performed and the parking state is then released.

\* \* \* \* \*